United States Patent
Faizakof et al.

(10) Patent No.: US 10,446,135 B2
(45) Date of Patent: Oct. 15, 2019

(54) SYSTEM AND METHOD FOR SEMANTICALLY EXPLORING CONCEPTS

(71) Applicant: GENESYS TELECOMMUNICATIONS LABORATORIES, INC., Daly City, CA (US)

(72) Inventors: Avraham Faizakof, Kfar-Warburg (IL); Yoni Lev, Tel Aviv (IL); Amir Lev-Tov, Bat-Yam (IL); Yochai Konig, San Francisco, CA (US)

(*) Notice: Subject to any disclaimer, the term of this patent is extended or adjusted under 35 U.S.C. 154(b) by 0 days.

(21) Appl. No.: 15/837,980

(22) Filed: Dec. 11, 2017

(65) Prior Publication Data

US 2018/0102126 A1   Apr. 12, 2018

Related U.S. Application Data

(63) Continuation of application No. 14/327,476, filed on Jul. 9, 2014, now Pat. No. 9,842,586.

(51) Int. Cl.
| | |
|---|---|
| G10L 15/00 | (2013.01) |
| G10L 15/06 | (2013.01) |
| G06F 16/35 | (2019.01) |
| G06F 16/28 | (2019.01) |
| G06F 17/27 | (2006.01) |
| G10L 15/22 | (2006.01) |

(52) U.S. Cl.
CPC .......... G10L 15/063 (2013.01); G06F 16/285 (2019.01); G06F 16/35 (2019.01); G06F 17/2755 (2013.01); G06F 17/2785 (2013.01); G10L 2015/0631 (2013.01); G10L 2015/223 (2013.01)

(58) Field of Classification Search
CPC ............ G06F 17/2785; G06F 17/2241; G06F 17/2765; G06F 17/30598; G06F 17/30601; G06F 17/30713; G06F 17/30705; G10L 15/26
See application file for complete search history.

(56) References Cited

U.S. PATENT DOCUMENTS

| | | | |
|---|---|---|---|
| 5,625,767 A | 4/1997 | Bartell et al. | |
| 5,659,662 A | 8/1997 | Wilcox et al. | |
| 5,799,268 A | 8/1998 | Boguraev | |
| 5,857,179 A | 1/1999 | Vaithyanathan et al. | |
| 6,173,261 B1 * | 1/2001 | Arai | G06F 17/274 704/231 |
| 6,212,494 B1 | 4/2001 | Boguraev | |

(Continued)

OTHER PUBLICATIONS

Al-Mubaid, Hisham, A Cross-Cluster Approach for Measuring Semantic Similarity between Concepts, International Conference on Information Reuse and Integration, pp. 551-556, Sep. 2006.

(Continued)

*Primary Examiner* — Edgar X Guerra-Erazo

(57) ABSTRACT

A method for detecting and categorizing topics in a plurality of interactions includes: extracting, by a processor, a plurality of fragments from the plurality of interactions; filtering, by the processor, the plurality of fragments to generate a filtered plurality of fragments; clustering, by the processor, the filtered fragments into a plurality of base clusters; and clustering, by the processor, the plurality of base clusters into a plurality of hyper clusters.

16 Claims, 20 Drawing Sheets

(56) References Cited

U.S. PATENT DOCUMENTS

| | | | |
|---|---|---|---|
| 6,928,407 B2* | 8/2005 | Ponceleon | G10L 15/1822 704/253 |
| 7,085,771 B2 | 8/2006 | Chung et al. | |
| 7,555,427 B2 | 6/2009 | Kirshenbaum | |
| 7,634,406 B2 | 12/2009 | Li et al. | |
| 7,853,544 B2 | 12/2010 | Scott et al. | |
| 7,940,915 B2 | 5/2011 | Onodera et al. | |
| 7,971,150 B2 | 6/2011 | Raskutti et al. | |
| 8,166,045 B1 | 4/2012 | Mazumdar et al. | |
| 8,380,491 B2 | 2/2013 | Leacock et al. | |
| 8,402,033 B1 | 3/2013 | Mazumdar et al. | |
| 8,666,744 B1* | 3/2014 | Arai | G06F 17/274 704/251 |
| 8,676,802 B2 | 3/2014 | Zelevinsky et al. | |
| 8,818,932 B2* | 8/2014 | Nolan | G06N 7/005 706/55 |
| 8,838,435 B2* | 9/2014 | Talley | G06F 17/2775 704/2 |
| 9,117,444 B2 | 8/2015 | Rachevsky et al. | |
| 9,330,660 B2* | 5/2016 | Arai | G06F 17/274 |
| 9,342,590 B2 | 5/2016 | Karidi et al. | |
| 9,355,169 B1 | 5/2016 | Mazumdar et al. | |
| 9,535,974 B1 | 1/2017 | Kesin et al. | |
| 9,842,586 B2* | 12/2017 | Faizakof | G10L 15/063 |
| 2002/0188681 A1 | 12/2002 | Gruen et al. | |
| 2003/0177000 A1 | 9/2003 | Mao et al. | |
| 2003/0217335 A1 | 11/2003 | Chung et al. | |
| 2003/0236659 A1 | 12/2003 | Castellanos | |
| 2006/0089924 A1 | 4/2006 | Raskutti et al. | |
| 2008/0103773 A1 | 5/2008 | Kirshenbaum | |
| 2009/0012826 A1 | 1/2009 | Eilam et al. | |
| 2009/0112588 A1 | 4/2009 | Kummamuru et al. | |
| 2009/0171662 A1 | 7/2009 | Huang et al. | |
| 2011/0238408 A1 | 9/2011 | Larcheveque et al. | |
| 2011/0238409 A1 | 9/2011 | Larcheveque et al. | |
| 2012/0137367 A1* | 5/2012 | Dupont | G06F 21/00 726/25 |
| 2014/0303978 A1* | 10/2014 | Arai | G06F 17/274 704/245 |
| 2015/0006531 A1 | 1/2015 | Deshpande et al. | |
| 2016/0012818 A1* | 1/2016 | Faizakof | G10L 15/063 704/245 |

OTHER PUBLICATIONS

Biemann, Chris., Chinese Whispers—an Efficient Graph Clustering Algorithm and its Application to Natural Language Processing Problems. Workshop on TextGraphics, at HLT-NAACL 2006, Association for Computational Linguistics, pp. 73-80, (2006).

Bouma, Gerlof, Normalized (Pointwise) Mutual Information in Collocation Extraction, Chiarcos, Eckert de Castilho & Stede (eds), Von der Form zur Bedeutung: Texte automatisch verarbeiten/From Form to Meaning: Processing Texts Automatically, Proceedings of the Biennial GSCL Conference 2009, pp. 31-40, Tubingn, Gunter Narr Verlag., 11 pages, (2009).

Cha, Sung-Hyuk, Comprehensive Survey on Distance/Similarity Measures between Probability Density Functions, International Journal of Mathematical Models and Methods in Applied Sciences, Issue 4, vol. 1, pp. 300-307, (2007).

International Search Report and Written Opinion for Application No. PCT/US2015/039816, dated Sep. 22, 2015, 12 pages.

Kolb, Peter, Disco a multilingual database of distributionally similar words, Proceedings of KONVENS—2008, Berlin, 8 pages, (2008).

Mikolov, Tomas, Distributed Representations of Words and Phrases and their Compositionality, Advances in Neural Information Processing Systems, pp. 3111-3119, (2013).

Toutanova, Kristina, Feature-Rick Part-of-Speech Tagging with a Cyclic Dependency Network, HLT-NAACL 2003, Human Language Technology Conference of the North American Chapter of the Association for Computational Linguistics, May 27-Jun. 1, Edmonton, Canada, 8 pages (2003).

* cited by examiner

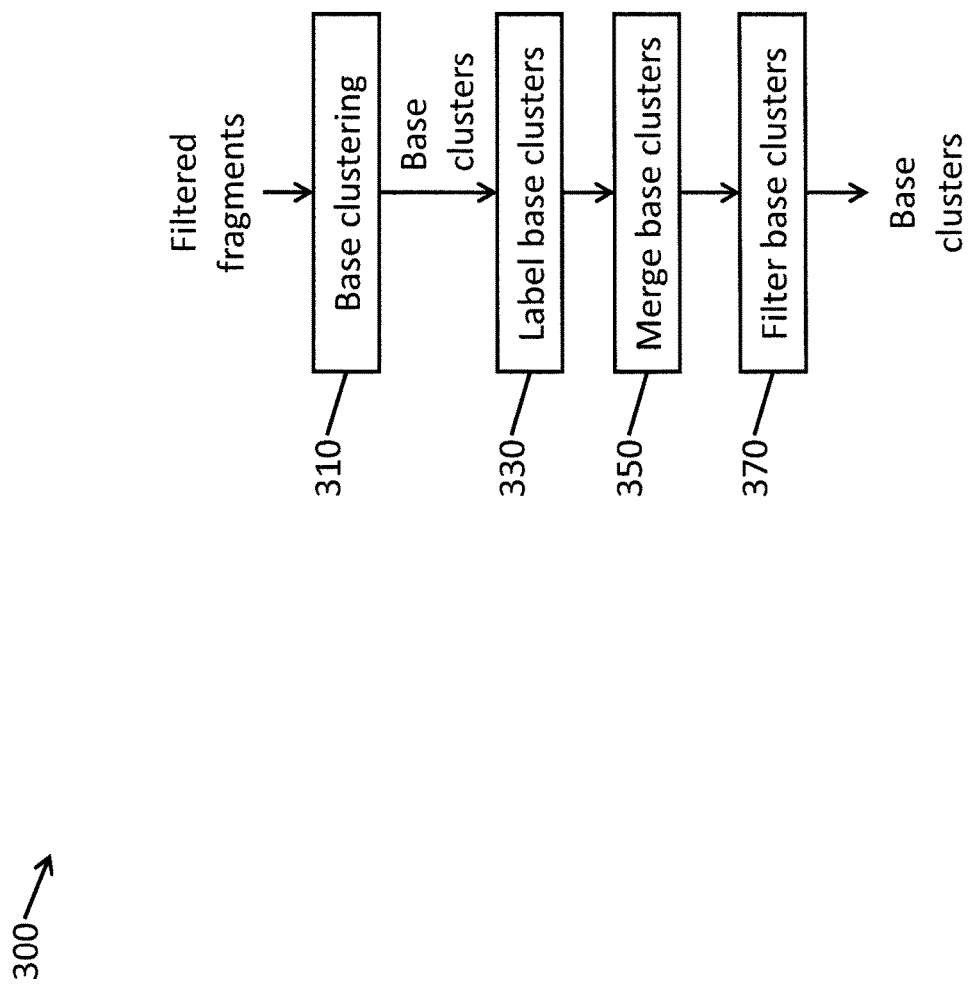

SYSTEM AND METHOD FOR SEMANTICALLY EXPLORING CONCEPTS

CROSS-REFERENCE TO RELATED APPLICATIONS

This application is a continuation of U.S. patent application Ser. No. 14/327,476, filed Jul. 9, 2014, now U.S. Pat. No. 9,842,586, the content of which is incorporated herein by reference.

FIELD

Aspects of the present invention relate to performing analytics on communications. In particular, aspects of the present invention relate to analyzing recorded and live information to categorize conversations and to identify concepts and trends.

BACKGROUND

An organization's contact center typically receives a multitude of communications or interactions (e.g., calls, text chat messages, email messages, social media messages, etc.) regarding a variety of issues. For example, a sales department of a contact center may take part in interactions involving questions about the feature sets and pricing of various products offered by the organization; a customer support department may interact with customers to discuss particular problems with using the products or the quality of the services being delivered; an accounts department may field interactions about changes in billing policy, incorrect charges, and other issues.

Generally, it is useful for an organization to be able to identify concepts and patterns within the conversations (or "interactions") in order to categorize the calls and identify underlying issues to be addressed (e.g., specific complaints about products or general dissatisfaction with services). However, conventional systems for doing so generally involve the manual survey of data collected by customer support agents and manual analysis of this data. This manual process of analysis can be time consuming and there may be long delays between collecting the data and determining results from the analysis.

In some conventional systems, conversations can be tagged or categorized based on their containing predefined keywords or phrases. For example, through the above discussed manual (human) analysis of phrases that are either identified by a human listener or identified by a computer system using phrase recognition, one might infer that conversations with a call center that contain the phrases "I would like to speak to your manager" and "Can I talk to your supervisor?" lead to the escalation of the call to a higher level representative. As such, any call containing these phrases would be categorized as containing an "escalation attempt."

As such, an organization can identify trends and infer conditions based on the number of such interactions falling into various categories. For example, a large number of interactions originating from a particular area and categorized as indicating a "service outage" or "poor network performance" could alert an internet service provider to take action to address system problems within that particular area.

However, conversations containing phrases that were not previously identified would not be categorized appropriately. For example, if the phrase "Let me talk to your boss" was not previously identified as being associated with escalation attempts, then a conversation containing that phrase would not be categorized as an "escalation attempt."

In addition, some conventional systems use Bayesian networks to identify correlations between events. However, developing these Bayesian networks requires significant human input to specify various parameters (e.g., the nodes of the Bayesian network).

SUMMARY

Aspects of embodiments of the present invention are directed to systems and methods for the discovery and exploration of topics and categories within a set of data. One aspect of the present invention is directed to the automatic discovery and extraction, without human assistance, of topics or concepts having similar meaning and semantics from a set of documents. The discovered and extracted topics can further be clustered into "parent categories," where each parent category contains one or more "base topics," thereby creating a hierarchical taxonomy.

The structure of parent categories that contain topics (or sub-topics) can be used to generate a global taxonomy of all the semantic issues and concepts identified in the domain. Such a global taxonomy can then be visualized for easy navigation by users and further analysis of current trends and issues.

According to one embodiment of the present invention, a method for detecting and categorizing topics in a plurality of interactions includes: extracting, by a processor, a plurality of fragments from the plurality of interactions; filtering, by the processor, the plurality of fragments to generate a filtered plurality of fragments; clustering, by the processor, the filtered fragments into a plurality of base clusters; and clustering, by the processor, the plurality of base clusters into a plurality of hyper clusters.

The extracting the plurality of fragments from the plurality of interactions may include: receiving, by the processor, text corresponding to the plurality of interactions; tagging, by the processor, portions of the text based on parts of speech; and extracting, by the processor, fragments from the text in accordance with one or more extraction rules.

The text corresponding to the plurality of interactions may include an output of an automatic speech recognition engine, the output being generated by processing at least one of the plurality of interactions through the automatic speech recognition engine.

The one or more extraction rules may include a part of speech sequence.

The one or more extraction rules may be automatically generated by the processor based on a plurality of manually extracted fragments.

The method may further include labeling, by the processor, a base cluster of the plurality of base clusters, the labeling including: extracting, by the processor, a plurality of noun phrases from the base cluster; computing, by the processor, a distribution of probabilities of stems of the noun phrases; and identifying, by the processor, a label noun phrase of the noun phrases, the label noun phrase having a highest probability based on the stem distribution.

The clustering the plurality of base clusters into the plurality of hyper clusters may include: computing, by the processor, a plurality of semantic distances between pairs of the plurality of base clusters; and clustering, by the processor, the base clusters into the hyper clusters in accordance with the semantic distances.

The plurality of semantic distances may be computed based on semantic similarities of the pairs of base clusters and co-occurrence of fragments in the pairs of base clusters.

The method may further include: generating, by the processor, a visualization of the plurality of topics as organized into a hierarchy based on the plurality of hyper clusters, at least one of the hyper clusters including a plurality of corresponding base clusters, each of the base clusters including a corresponding plurality of fragments.

According to one embodiment of the present invention, a system includes: a processor; and a memory, wherein the memory has stored thereon instructions that, when executed by the processor, cause the processor to: receive a plurality of interactions; extract a plurality of fragments from the plurality of interactions; filter the plurality of fragments to generate a filtered plurality of fragments; cluster the filtered fragments into a plurality of base clusters; and cluster the plurality of base clusters into a plurality of hyper clusters.

The instructions that cause the processor to extract the plurality of fragments from the plurality of interactions may include instructions that, when executed by the processor, cause the processor to: receive text corresponding to the plurality of interactions; tag portions of the text based on parts of speech; and extract fragments from the text in accordance with one or more extraction rules.

The text corresponding to the plurality of interactions may include an output of an automatic speech recognition engine, the output being generated by processing at least one of the plurality of interactions through the automatic speech recognition engine.

The one or more extraction rules may include a part of speech sequence.

The memory may further have stored thereon instructions that, when executed by the processor, cause the processor to generate the one or more extraction rules based on a plurality of manually extracted fragments.

The memory may further have stored thereon instructions that, when executed by the processor, cause the processor to label a base cluster of the plurality of base clusters by: extracting a plurality of noun phrases from the base cluster; computing a distribution of probabilities of stems of the noun phrases; and identifying a label noun phrase of the noun phrases, the label noun phrase having a highest probability based on the stem distribution.

The instructions that cause the processor to cluster the plurality of base clusters into the plurality of hyper clusters may include instructions that, when executed by the processor, cause the processor to: compute a plurality of semantic distances between pairs of the plurality of base clusters; and cluster the base clusters in into the hyper clusters in accordance with the semantic distances.

The instructions that cause the processor to compute the plurality of semantic distances between the pairs of the base clusters may include instructions to compute a semantic distance of the semantic distances based on semantic similarities between the pairs of the base clusters and co-occurrence of fragments in the pairs of the base clusters.

The memory may further have stored thereon instructions that, when executed by the processor, cause the processor to generate a visualization of a plurality of topics as organized into a hierarchy based on the plurality of hyper clusters, at least one of the hyper clusters including a plurality of corresponding base clusters, each of the base clusters including a corresponding plurality of fragments.

BRIEF DESCRIPTION OF THE DRAWINGS

The accompanying drawings, together with the specification, illustrate exemplary embodiments of the present invention, and, together with the description, serve to explain the principles of the present invention.

FIG. 9A is a flowchart illustrating a method for automatically generating hyper clusters of fragments according to one embodiment of the present invention.

DETAILED DESCRIPTION

Figure 1:
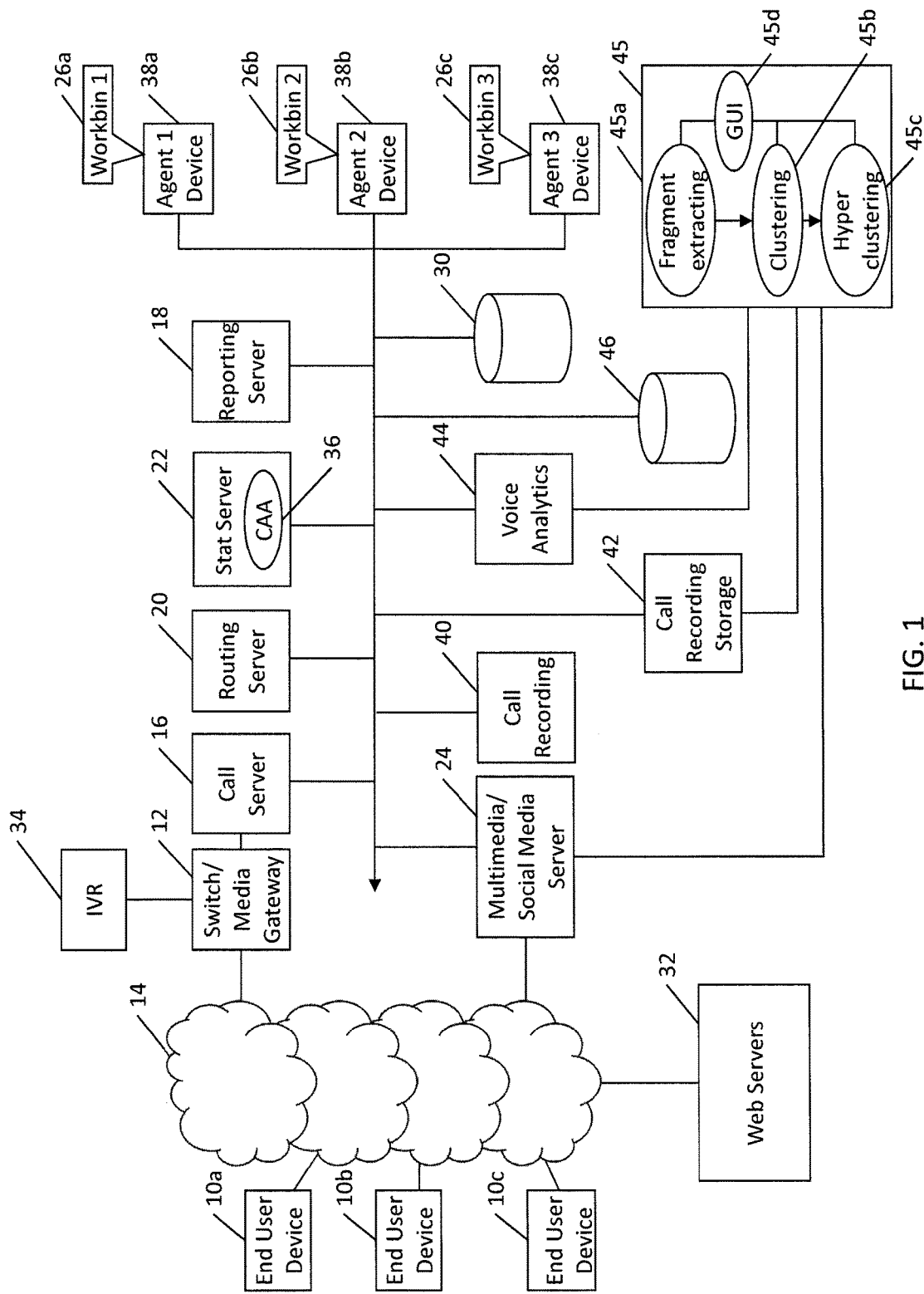
FIG. 1 is a schematic block diagram of a system supporting a contact center that is configured to provide access to searchable transcripts to customer service agents according to one exemplary embodiment of the invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Some embodiments of the present invention will be described in the context of a contact center. However, embodiments of the present invention are not limited thereto and may also be used in under other conditions involving searching recorded audio such as in computer based education systems, voice messaging systems, medical transcripts, or any speech corpora from any source.

Aspects of embodiments of the present invention are directed to a system and method for automatically inferring and deducing topics of discussion (or "concepts") from a body of recorded or live interactions (or conversations). These interactions may include, for example, telephone conversations, text-based chat sessions, email conversation threads, and the like. The inferring of these concepts does not require manual categorization by a human and can be performed by the system (or the "analytics system") according to embodiments of the present invention. Therefore, new, previously unidentified topics of conversation can quickly be identified and brought to the attention of an organization without performing a manual analysis of conversation logs.

For example, suppose a company released a new version product that added Bluetooth® connectivity and there were no predefined categories in the interactions analytics system to match the phrases "Bluetooth connection" or "Bluetooth pairing" to issues with Bluetooth® connections. In conventional systems, this category might go undetected until those phrases were manually added to the analytics system.

In contrast, embodiments of the present invention are directed to a system and method for identifying salient phrases, generating new categories (or "concepts" or "topics") based on these identified phrases, and categorizing interactions based on these automatically identified categories. As a result, embodiments of the present invention can be used to alert organizations to newly trending topics within interactions (e.g., conversations with customers), thereby allowing faster responses to changing circumstances. See, e.g., FIG. 3, which is a screenshot of a portion of a category distribution report 1 showing exemplary categories "New Customer," "Emergency," "Identification," "Billing," and "Payment Inquiry" along the number of interactions categorized into each of these categories and the percentages of all calls that involve these categories. Note that the percentages add up to more than 100% because any given interaction may be assigned to multiple categories or not assigned to any category. Viewing this category distribution report, an organization can assess the most frequently discussed topics.

In addition, embodiments of the present invention are directed to a system and method for generating a taxonomy of topics and displaying the taxonomy in a way that allow for easier analysis of current patterns in interactions. See, e.g., FIG. 6, in which a global taxonomy of topics is shown as a collection of nested and clustered circles.

Therefore, embodiments of the present invention are directed to systems and methods for providing timely summary of trends in topics of discussion in a collection of interactions and systems and methods for generating and displaying a taxonomy of topics.

In one embodiment, the above-described systems and methods are used in the context of a contact center and are used to monitor and infer topics of conversation during interactions between customers and an organization, as the topics may be organized into a taxonomy.

FIG. 1 is a schematic block diagram of a system supporting a contact center that is configured to provide customer availability information to customer service agents according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such agent becomes available, the call server may place the call in, for example, a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to a corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via a variety of communication mechanisms such as chat, instant messaging, voice calls, and the like.

The selection of an appropriate agent for routing an inbound call may be based, for example, on a routing strategy employed by the routing server 20, and further based on information about agent availability, skills, and other routing parameters provided, for example, by a statistics server 22. According to one exemplary embodiment of the invention, the statistics server 22 includes a customer availability aggregation (CAA) module 36 for monitoring availability of end users on different communication channels and providing such information to, for example, the routing server 20, agent devices 38a-38c, and/or other contact center applications and devices. The CAA module may also be deployed in a separate application server. The aggregation module 36 may be a software module implemented via computer program instructions which are stored in memory of the statistics server 22 (or some other server), and which program instructions are executed by a processor. A person of skill in the art should recognize that the aggregation module 36 may also be implemented via firmware (e.g. an application-specific integrated circuit), hardware, or a combination of software, firmware, and hardware.

According to one exemplary embodiment, the aggregation module 36 is configured to receive customer availability information from other devices in the contact center, such as, for example, the multimedia/social media server 24. For example, the multimedia/social media server 24 may be configured to detect user presence on different websites including social media sites, and provide such information to the aggregation module 36. The multimedia/social media server 24 may also be configured to monitor and track interactions on those websites.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the contact center also includes one or more mass storage devices 30 for storing different databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

According to one embodiment of the present invention, the contact center 102 also includes a call recording server 40 for recording the audio of calls conducted through the contact center 102, a call recording storage server 42 for storing the recorded audio, a speech analytics server 44 configured to process and analyze audio collected in the from the contact center 102, and a speech index database 46 for providing an index of the analyzed audio.

The speech analytics server 44 may be coupled to (or may include) an analytics server 45 including a topic detecting module 45a, a root cause mining module 45b, and a user interface module 45d. The analytics server 45 may be configured to provide the automatic detection of topics from interactions recorded by the call recording server 40 and stored on the call recording storage server 42. The analytics server 45 may also access data stored on, for example, the multimedia/social media server 24 in order to process interactions from various chat, social media, email, and other non-voice interactions.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Each of the various servers in the contact center may be a process or thread, running on one or more processors, in one or more computing devices 500 (e.g., FIG. 2A, FIG. 2B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers and other modules.

Figure 2A:
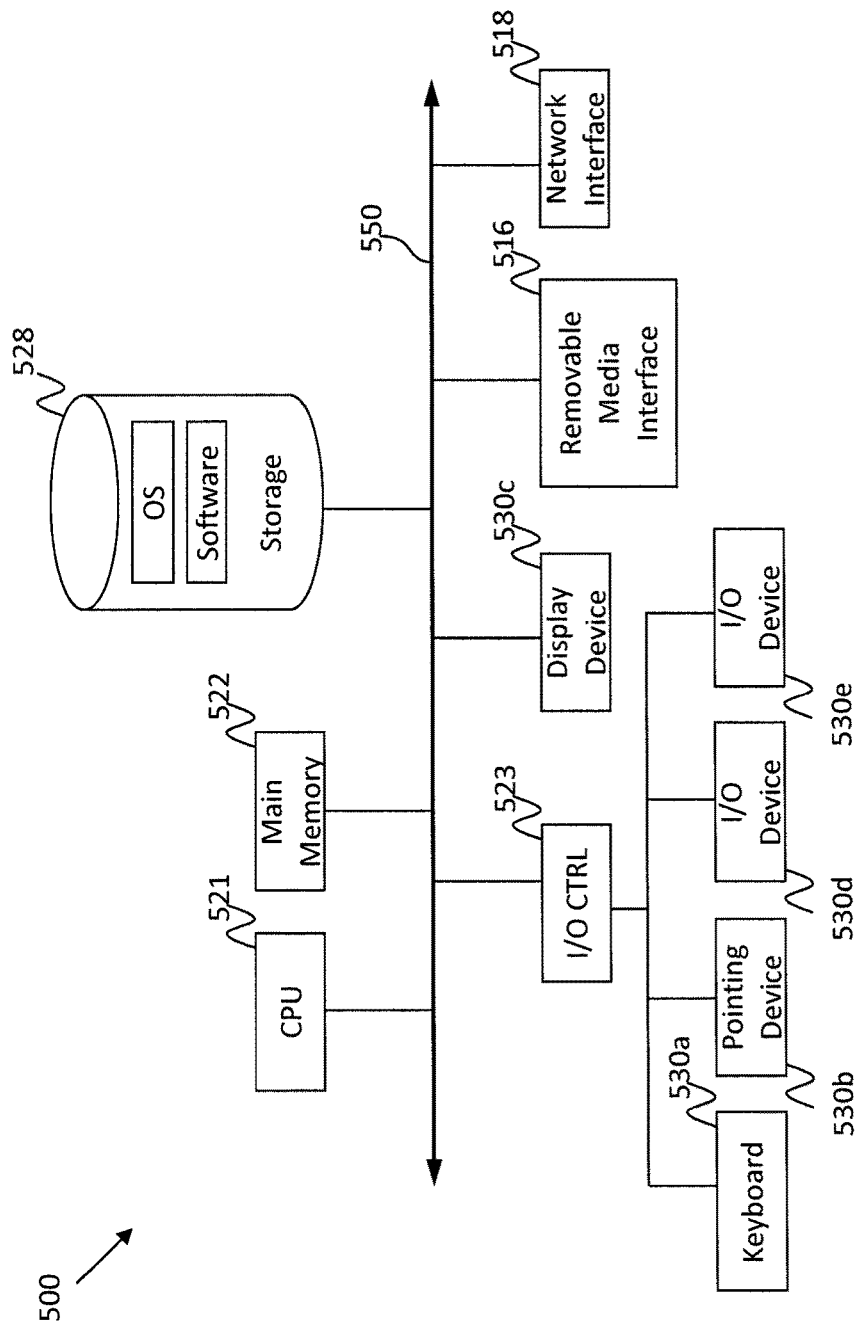
FIG. 2A is a block diagram of a computing device according to an embodiment of the present invention.
Figure 2B:
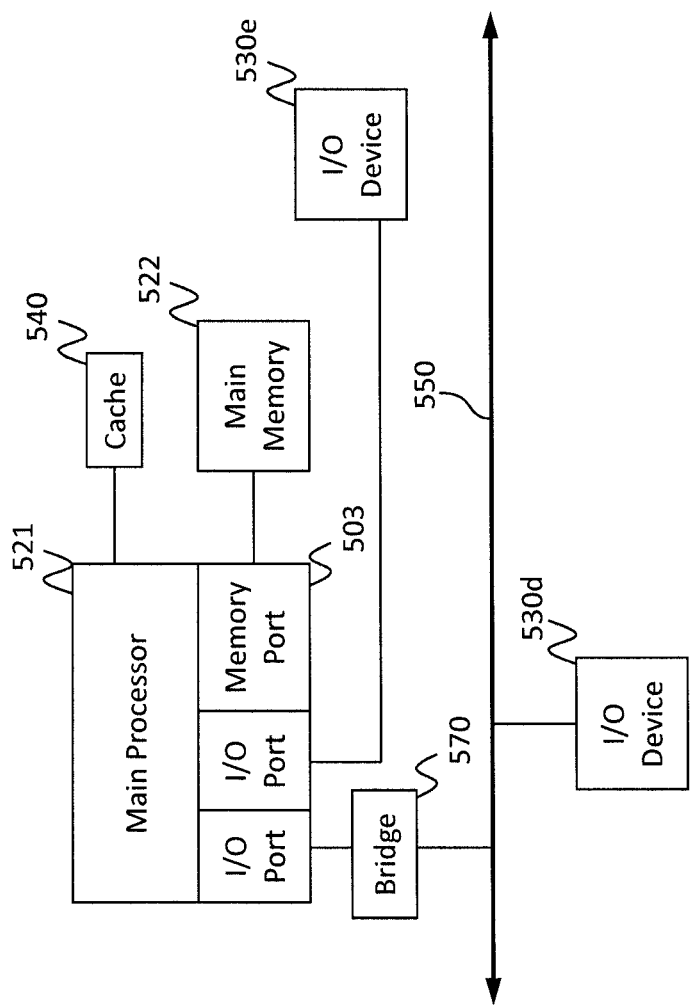
FIG. 2B is a block diagram of a computing device according to an embodiment of the present invention.

FIG. 2A and FIG. 2B depict block diagrams of a computing device 500 as may be employed in exemplary embodiments of the present invention. As shown in FIG. 2A and FIG. 2B, each computing device 500 includes a central processing unit 521, and a main memory unit 522. As shown in FIG. 2A, a computing device 500 may include a storage device 528, a removable media interface 516, a network interface 518, an input/output (I/O) controller 523, one or more display devices 530c, a keyboard 530a and a pointing device 530b, such as a mouse. The storage device 528 may include, without limitation, storage for an operating system and software. As shown in FIG. 2B, each computing device 500 may also include additional optional elements, such as a memory port 503, a bridge 570, one or more additional input/output devices 530d, 530e and a cache memory 540 in communication with the central processing unit 521. Input/output devices, e.g., 530a, 530b, 530d, and 530e, may be referred to herein using reference numeral 530.

The central processing unit 521 is any logic circuitry that responds to and processes instructions fetched from the main memory unit 522. It may be implemented, for example, in an integrated circuit, in the form of a microprocessor, microcontroller, or graphics processing unit (GPU), or in a field-programmable gate array (FPGA) or application-specific integrated circuit (ASIC). Main memory unit 522 may be one or more memory chips capable of storing data and allowing any storage location to be directly accessed by the central processing unit 521. In the embodiment shown in FIG. 2A, the central processing unit 521 communicates with main memory 522 via a system bus 550. FIG. 2B depicts an embodiment of a computing device 500 in which the central processing unit 521 communicates directly with main memory 522 via a memory port 503.

FIG. 2B depicts an embodiment in which the central processing unit 521 communicates directly with cache memory 540 via a secondary bus, sometimes referred to as a backside bus. In other embodiments, the central processing unit 521 communicates with cache memory 540 using the system bus 550. Cache memory 540 typically has a faster response time than main memory 522. In the embodiment shown in FIG. 2A, the central processing unit 521 communicates with various I/O devices 530 via a local system bus 550. Various buses may be used as a local system bus 550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 530c, the central processing unit 521 may communicate with the display device 530c through an Advanced Graphics Port (AGP). FIG. 2B depicts an embodiment of a computer 500 in which the central processing unit 521 communicates directly with I/O device 530e. FIG. 2B also depicts an embodiment in which local busses and direct communication are mixed: the central processing unit 521 communicates with I/O device 530d using a local system bus 550 while communicating with I/O device 530e directly.

A wide variety of I/O devices 530 may be present in the computing device 500. Input devices include one or more keyboards 530a, mice, trackpads, trackballs, microphones, and drawing tablets. Output devices include video display devices 530c, speakers, and printers. An I/O controller 523, as shown in FIG. 2A, may control the I/O devices. The I/O controller may control one or more I/O devices such as a keyboard 530a and a pointing device 530b, e.g., a mouse or optical pen.

Referring again to FIG. 2A, the computing device 500 may support one or more removable media interfaces 516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 530 may be a bridge between the system bus 550 and a removable media interface 516.

The removable media interface 516 may for example be used for installing software and programs. The computing device 500 may further include a storage device 528, such as one or more hard disk drives or hard disk drive arrays, for storing an operating system and other related software, and for storing application software programs. Optionally, a removable media interface 516 may also be used as the storage device. For example, the operating system and the software may be run from a bootable medium, for example, a bootable CD.

In some embodiments, the computing device 500 may include or be connected to multiple display devices 530c, which each may be of the same or different type and/or form. As such, any of the I/O devices 530 and/or the I/O controller 523 may include any type and/or form of suitable hardware, software, or combination of hardware and software to support, enable or provide for the connection to, and use of, multiple display devices 530c by the computing device 500. For example, the computing device 500 may include any type and/or form of video adapter, video card, driver, and/or library to interface, communicate, connect or otherwise use the display devices 530c. In one embodiment, a video adapter may include multiple connectors to interface to multiple display devices 530c. In other embodiments, the computing device 500 may include multiple video adapters, with each video adapter connected to one or more of the display devices 530c. In some embodiments, any portion of the operating system of the computing device 500 may be configured for using multiple display devices 530c. In other embodiments, one or more of the display devices 530c may be provided by one or more other computing devices, connected, for example, to the computing device 500 via a network. These embodiments may include any type of software designed and constructed to use the display device of another computing device as a second display device 530c for the computing device 500. One of ordinary skill in the art will recognize and appreciate the various ways and embodiments that a computing device 500 may be configured to have multiple display devices 530c.

A computing device 500 of the sort depicted in FIG. 2A and FIG. 2B may operate under the control of an operating system, which controls scheduling of tasks and access to system resources. The computing device 500 may be running any operating system, any embedded operating system, any real-time operating system, any open source operating system, any proprietary operating system, any operating systems for mobile computing devices, or any other operating system capable of running on the computing device and performing the operations described herein.

The computing device 500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 500 may be a virtualized computing device and the virtualized computing device may be running in a networked or cloud based environment. In some embodiments, the computing device 500 may have different processors, operating systems, and input devices consistent with the device.

In other embodiments the computing device 500 is a mobile device, such as a Java-enabled cellular telephone or personal digital assistant (PDA), a smart phone, a digital audio player, or a portable media player. In some embodiments, the computing device 500 includes a combination of devices, such as a mobile phone combined with a digital audio player or portable media player.

Figure 2D:
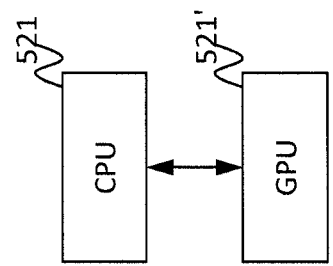
FIG. 2D is a block diagram of a computing device according to an embodiment of the present invention.
Figure 2C:
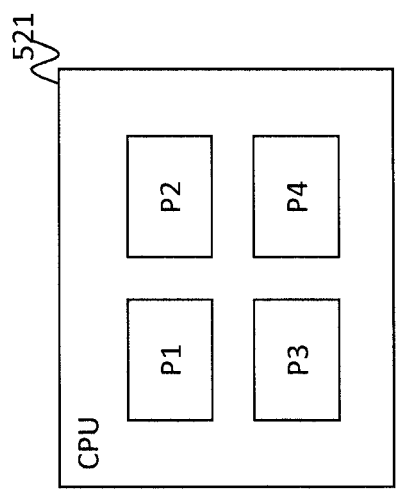
FIG. 2C is a block diagram of a computing device according to an embodiment of the present invention.

As shown in FIG. 2C, the central processing unit 521 may include multiple processors P1, P2, P3, P4, and may provide functionality for simultaneous execution of instructions or for simultaneous execution of one instruction on more than one piece of data. In some embodiments, the computing device 500 may include a parallel processor with one or more cores. In one of these embodiments, the computing device 500 is a shared memory parallel device, with multiple processors and/or multiple processor cores, accessing all available memory as a single global address space. In another of these embodiments, the computing device 500 is a distributed memory parallel device with multiple processors each accessing local memory only. In still another of these embodiments, the computing device 500 has both some memory which is shared and some memory which may only be accessed by particular processors or subsets of processors. In still even another of these embodiments, the central processing unit 521 includes a multicore microprocessor, which combines two or more independent processors into a single package, e.g., into a single integrated circuit (IC). In one exemplary embodiment, depicted in FIG. 2D, the computing device 500 includes at least one central processing unit 521 and at least one graphics processing unit 521'.

In some embodiments, a central processing unit 521 provides single instruction, multiple data (SIMD) functionality, e.g., execution of a single instruction simultaneously on multiple pieces of data. In other embodiments, several processors in the central processing unit 521 may provide functionality for execution of multiple instructions simultaneously on multiple pieces of data (MIMD). In still other embodiments, the central processing unit 521 may use any combination of SIMD and MIMD cores in a single device.

Figure 2E:
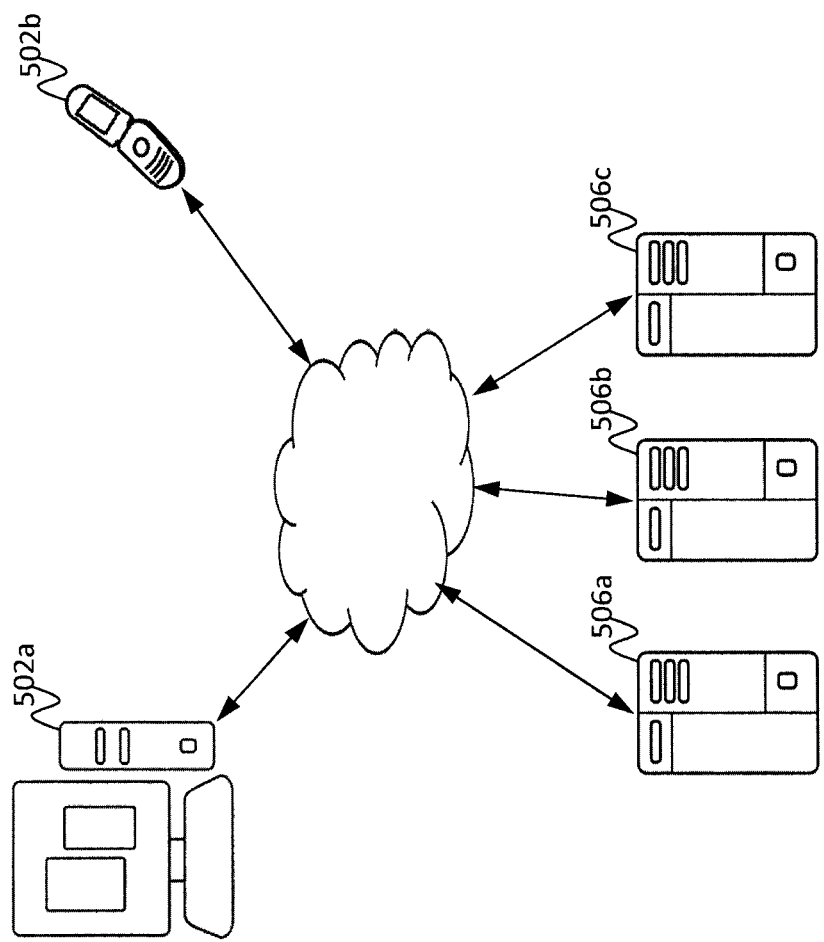
FIG. 2E is a block diagram of a network environment including several computing devices according to an embodiment of the present invention.

A computing device may be one of a plurality of machines connected by a network, or it may include a plurality of machines so connected. FIG. 2E shows an exemplary network environment. The network environment includes one or more local machines 502a, 502b (also generally referred to as local machine(s) 502, client(s) 502, client node(s) 502, client machine(s) 502, client computer(s) 502, client device(s) 502, endpoint(s) 502, or endpoint node(s) 502) in communication with one or more remote machines 506a, 506b, 506c (also generally referred to as server machine(s) 506 or remote machine(s) 506) via one or more networks 504. In some embodiments, a local machine 502 has the capacity to function as both a client node seeking access to resources provided by a server machine and as a server machine providing access to hosted resources for other clients 502a, 502b. Although only two clients 502 and three server machines 506 are illustrated in FIG. 2E, there may, in general, be an arbitrary number of each. The network 504 may be a local-area network (LAN), e.g., a private network such as a company Intranet, a metropolitan area network (MAN), or a wide area network (WAN), such as the Internet, or another public network, or a combination thereof.

The computing device 500 may include a network interface 518 to interface to the network 504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 500 communicates with other computing devices 500 via any type and/or form of gateway or tunneling protocol such as Secure Socket Layer (SSL) or Transport Layer Security (TLS). The network interface 518 may include a built-in network adapter, such as a network interface card, suitable for interfacing the computing device 500 to any type of network capable of communication and performing the operations described herein. An I/O device 530 may be a bridge between the system bus 550 and an external communication bus.

According to various embodiments of the present invention, exploration and discovery technologies are directed toward discovering interesting phenomena (e.g., detecting and organizing data into topics) without the user input in other words, identifying information that is relevant to the user without the user explicitly looking for this information. Embodiments of the present invention are also directed to organizing the detected topics into a taxonomy or hierarchy. Categorization technologies are generally focused on classifying documents (e.g., text, audio, and video) into predefined categories such as "all the calls in which a customer has asked to speak to a supervisor."

Figure 3:
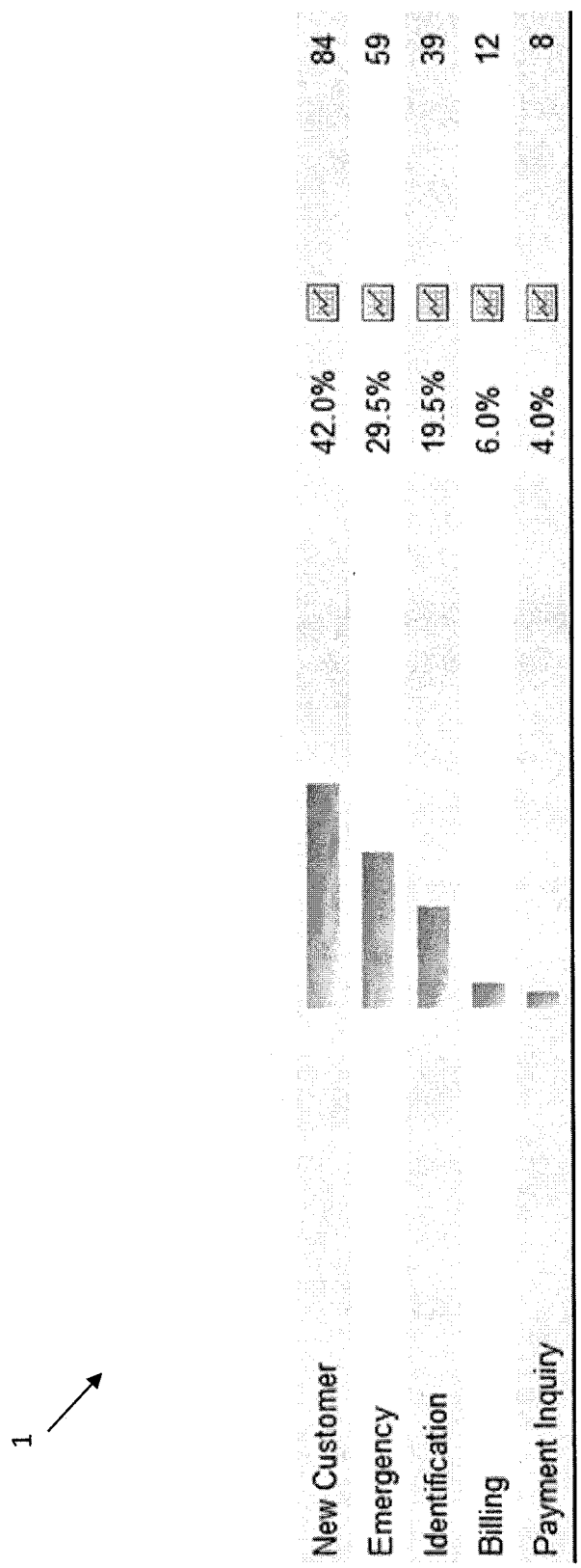
FIG. 3 is a screenshot of a category distribution report according to one embodiment of the present invention.

FIG. 3 is a screenshot of a category distribution report according to one embodiment of the present invention. In this report, the voice calls, customer-agent phone conversations (or interactions) that have occurred in the last 7 days have been classified into categories (e.g., predefined categories) that represent the set of known reasons for calls. In other embodiments, conversations are aggregated over different time periods (e.g., over the past day, over the past hour, over the past month, since a particular date, or between two arbitrary dates) may be aggregated. In addition, in other embodiments, the interactions may be limited to particular communication channels, such as one or more of telephone, email, chat, and social media, limited to interactions from particular contact centers, or limited to interactions from particular departments (e.g., sales or customer support).

Figure 4:
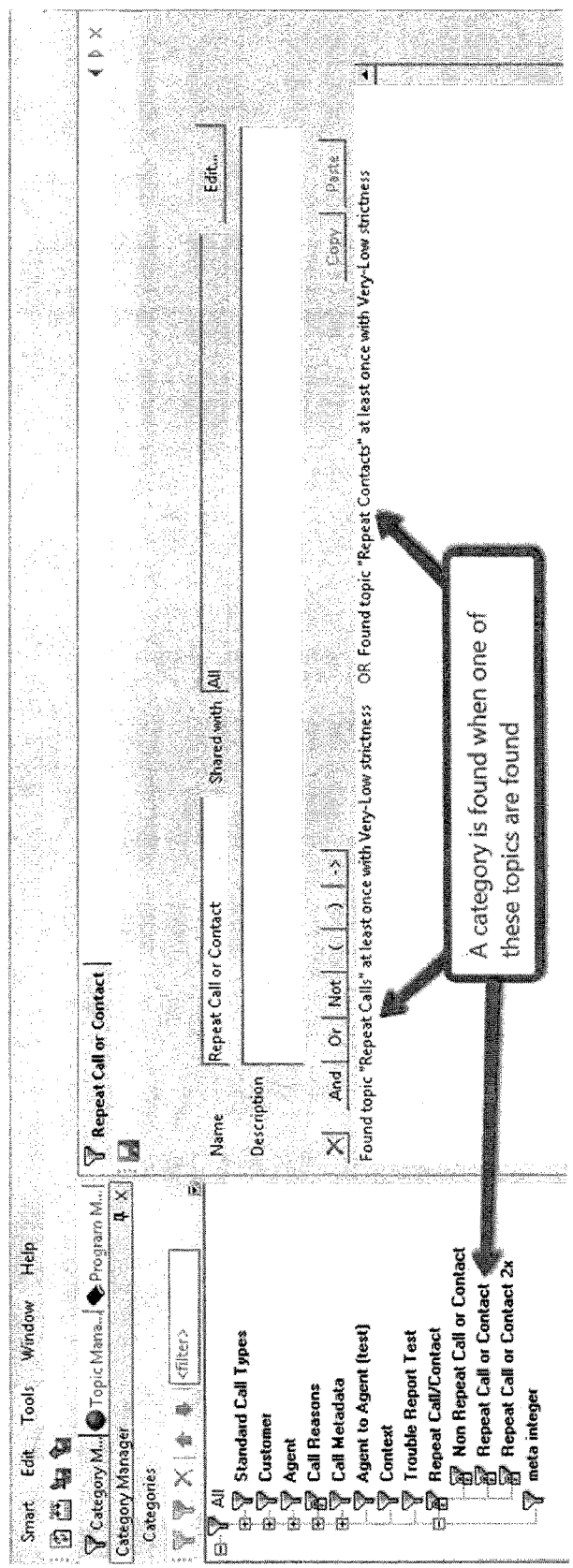
FIG. 4 is a screenshot illustrating an interface for customizing and defining predefined categories according to one embodiment of the present invention.

FIG. 4 is a screenshot illustrating an interface for customizing and defining predefined categories according to one embodiment of the present invention. Each predefined category can be defined as some Boolean expression of topics where each topic may be defined as a union of phrases or words, thereby producing a set of categorizing rules used to classify the interactions. For example, FIG. 4 illustrates the definition of the "Repeat Call or Contact" category, which is defined by interactions having 'Found topic "Repeat Calls" at least once with Very-Low strictness OR Found topic "Repeat Contacts" at least once with Very-Low strictness'. The "Repeat Calls" and "Repeat Contact" topics may be triggered, for example, by detecting particular triggering events such as a record of multiple calls from a particular phone number or by identifying particular phrases in the interaction such as "thanks for calling again".

When one of these phrases of the Boolean expression is spoken in a conversation, various speech recognition technologies can recognize it in the audio. (One such technology is phrase recognition as described in U.S. Pat. No. 7,487,094 "System and method of call classification with context modeling based on composite words" the content of which is incorporated herein by reference) In other embodiments, the interactions are conducted over other media (for example, text chat) and other appropriate methods of detecting phrases are used. Upon detecting one of these phrases, it triggers the detection of topics to which these phrases belong. The detection of topics feed the appropriate categorizing rules matching the given category are triggered and the interaction is labeled in accordance with the matching categories.

Therefore, according to one embodiment, the analytics server 45 can generate the category distribution report by counting the number of interactions within a given time period that fall within each category.

Figure 5:
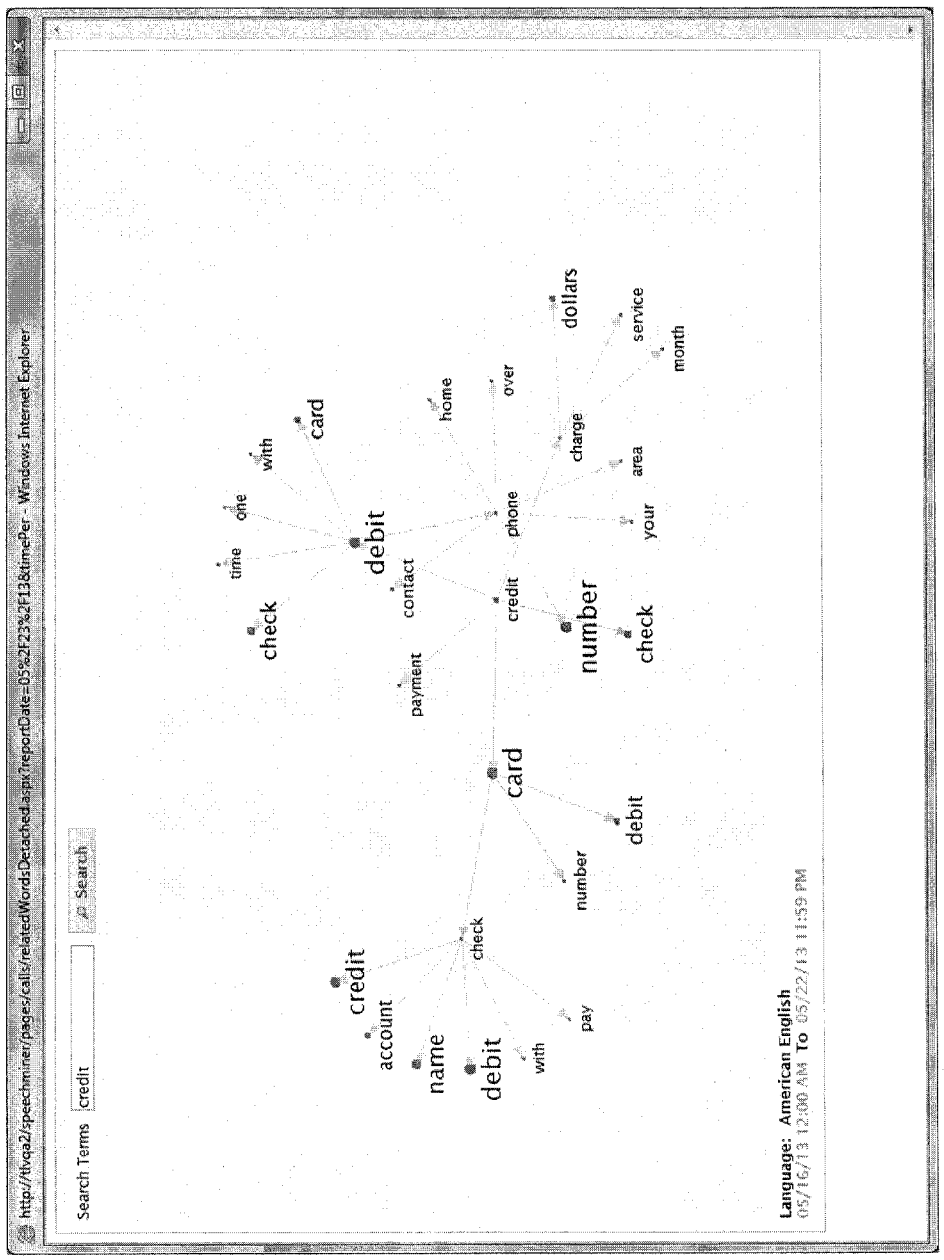
FIG. 5 is a screenshot illustrating an interface for exploring relationships between topics in a plurality of interactions according to one embodiment of the present invention.

According to one embodiment of the present invention, an analytics server 45 provides a user with the ability to view or "explore" related words, as illustrated, for example, in FIG. 5. A user can start from a single word and explore the co-occurrence of the starting word with other words in various conversations. For instance, FIG. 5 depicts the relationship or co-occurrence of the word "credit" with other words in the set of relevant calls.

Figure 6A:
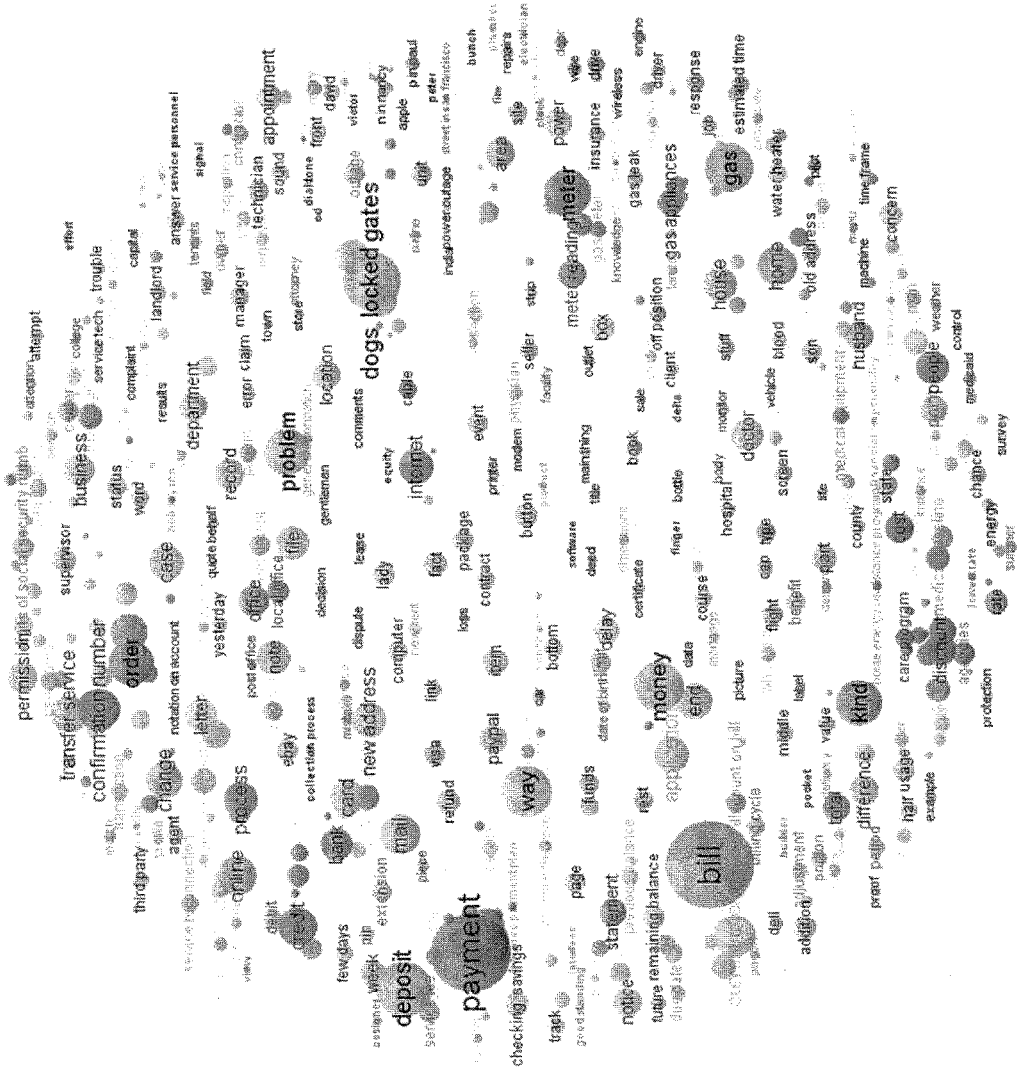
FIG. 6A is a screenshot illustrating an interface depicting the relationship of identified topics in a large of documents as a taxonomy (e.g., "global taxonomy") according to one embodiment of the present invention.
Figure 6B:
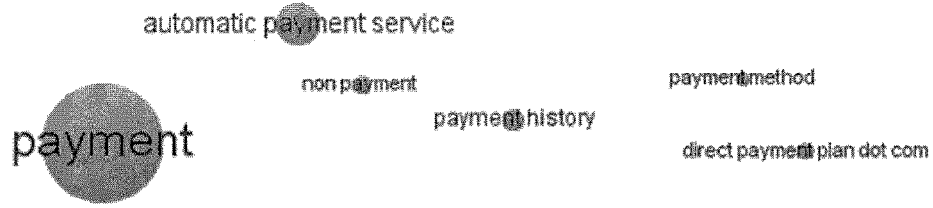
FIGS. 6B and 6C are screenshots illustrating an interface depicting clusters within the larger taxonomy according to one embodiment of the present invention.
Figure 6C:
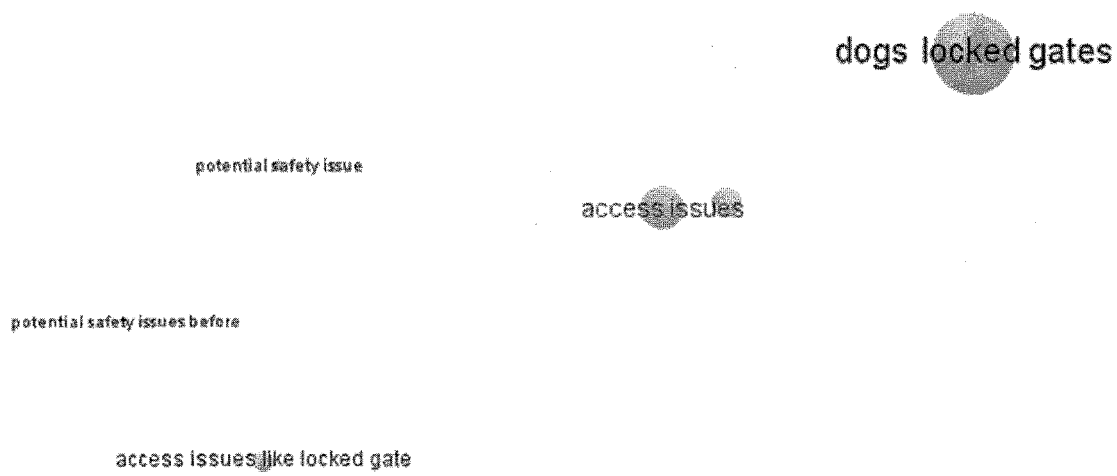

The detected topics can be categorized and organized into a global taxonomy of topics, as illustrated. FIG. 6A depicts the relationship of identified topics in a large of documents as a taxonomy (e.g., "global taxonomy") according to one embodiment of the present invention. FIGS. 6B and 6C illustrate clusters within the larger taxonomy according to one embodiment of the present invention.

Figure 7:
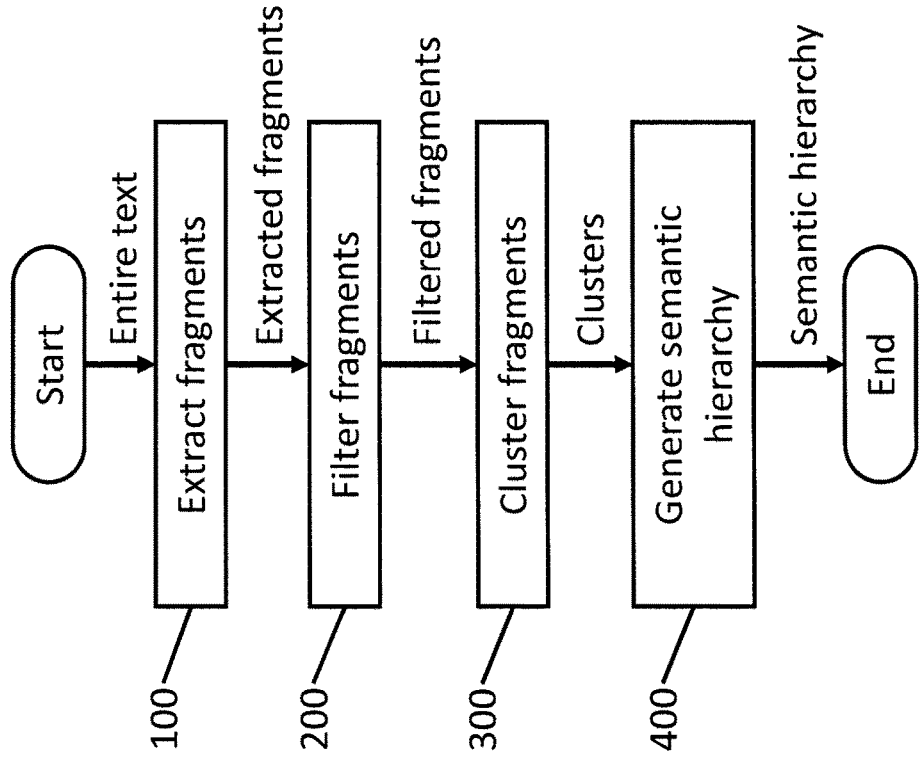
FIG. 7 is a flowchart illustrating a process for identifying topics and generating a taxonomy according to one embodiment of the present invention.

FIG. 7 is a flowchart illustrating a process for identifying topics and generating a taxonomy according to one embodiment of the present invention. Referring to FIG. 7, in operation 100, information is extracted from a collection of documents using linguistic rules. The extracted information may be referred to herein as "fragments." In operation 200, fragments are filtered, and, in operation 300, the filtered fragments are clustered into base clusters. For example, base clusters may include "payment plan" and "payment arrangement." In operation 400, the base clusters are further semantically clustered based on semantic distance to automatically generate a semantic hierarchy of "hyper clusters" or "parent categories." Continuing the example, the hyper clustering process my combine the "payment plan" and "payment arrangement" base clusters into one semantic "payment arrangement" parent category (or hyper cluster).

According to various embodiments of the present invention, the semantic distance may be computed based on semantic similarity and co-occurrence analysis. In addition, embodiments of the present invention are directed to tracking the development of topics and categories over time to detect if a topic is new or part of an existing taxonomy of a domain.

The fragment extraction operation 100, the filtering operation 200, the clustering operation 300, and the hyper clustering operation 400 according to embodiments of the present invention will be described in more detail below.

Figure 8A:
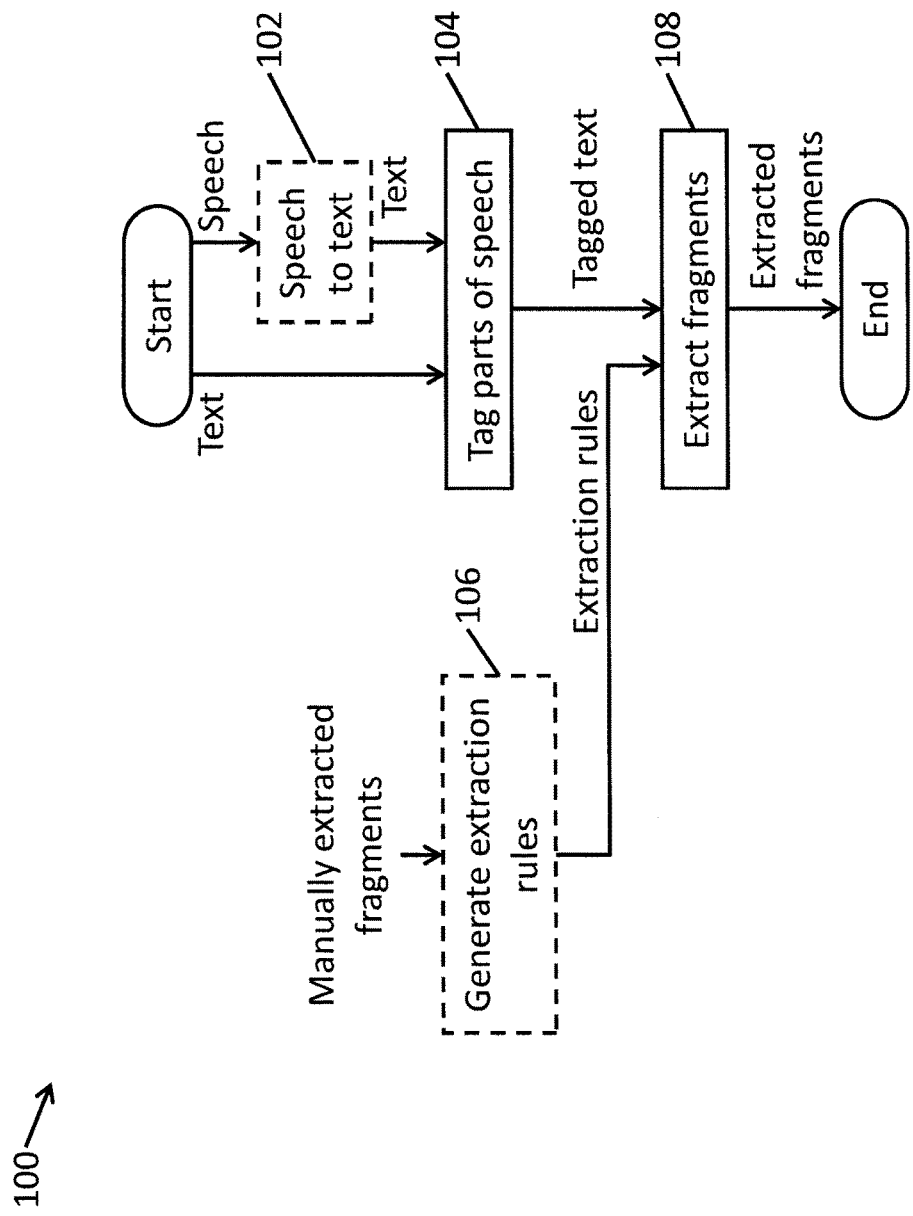
FIG. 8A is a flowchart illustrating a method for extracting fragments from within interactions according to one embodiment of the present invention.
Figure 8B:
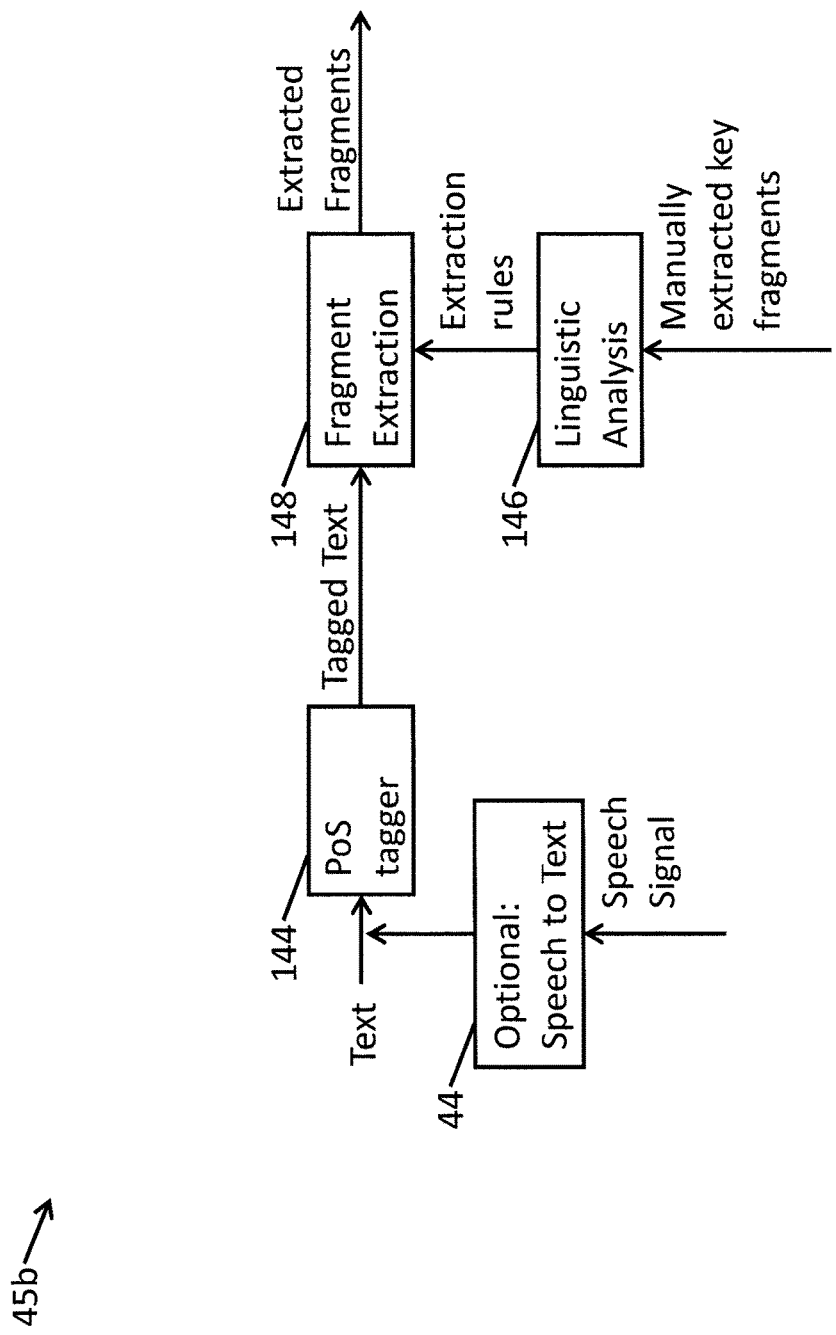
FIG. 8B is a block diagram illustrating a system for extracting fragments from within interactions according to one embodiment of the present invention.

FIG. 8A is a flowchart illustrating a method for extracting fragments according to one embodiment of the present invention. FIG. 8B is a block diagram illustrating a fragment extracting module 45a of the analytics server 45 for extracting fragments from interactions (e.g., text and text transcriptions of audio) according to one embodiment of the present invention. Fragments are extracted from interactions by supplying the entire body of interactions (or the entire body of text) to the system (e.g., the analytics server 45 as shown in FIG. 1, which may be a computer system 500 as shown in FIG. 2A, including the fragment extracting module 45a as shown in FIG. 1) configured to perform the clustering.

When the interactions being processed are the output of large-vocabulary continuous speech recognition (LVCSR) in optional operation 102 (e.g., as performed by speech analytics module 44), low confidence words may be filtered out before supplying the documents to the text to the fragment extraction process so that only words with high confidence remain in the text to be processed. In some embodiments, if the exploration is done on email, chat, or other text, the entire text is used (e.g., without filtering based on confidence).

In operation 104, "parts of speech" are identified out of the supplied text (e.g., the text of emails, chats, etc. or the output of an LVCSR system) by the PoS tagger 144. Table 1 provides an example of an input piece of text and an output in which various words or phrases are labeled with their parts of speech:

TABLE 1

| | |
|---|---|
| Input | I am calling because I want to make a payment arrangement on my balance |
| Output | I/PRP am/VBP calling/VBG because/IN I/PRP want/VBP to/TO make/VB a/DT payment/NN arrangement/NN on/IN my/PRP balance/NN |

Methods for automatically analyzing and tagging text with their parts of speech are well known to those of ordinary skill in the art. (See, e.g., Toutanova, K. et al. "Feature-Rich Part-of-Speech Tagging with a Cyclic Dependency Network" NAACL 2003 Vol. 1, 173-180.)

In operation 106, manually extracted key fragments are automatically linguistically analyzed by the linguistic analysis module 146. The manually extracted key fragments are extracted by, for example, an expert (or "auditor") who has highlighted particular phrases as being semantically relevant. For example, given a sentence "I am calling because I want to make a payment arrangement," the auditor may mark the fragment "make a payment arrangement" as being particularly relevant. The auditor may also mark fragments that convey the reason for contacting the contact center, fragments that reflect the resolution of the interaction, fragments that relate to events related to the process of the resolution (e.g., "let me transfer you to my supervisor" or "please hold while I transfer you to a connections representative"), and fragments that could otherwise be of interest to those analyzing the interactions with the contact center.

In operation 106, optional automatic linguistic analysis of the manually extracted key fragments by a linguistic analysis module 146 generates a set of extraction rules. In some embodiments of the present invention, the extraction rules are generated by performing the linguistic analysis manually (e.g., by the auditor or other expert). For example, the manually extracted fragment "make a payment arrangement" can be analyzed based on the parts of speech and can be represented as "make/VB a/DT payment/NN arrangement/NN". The sequence of parts of speech (or "PoS sequence") of the above fragment would therefore be VB DT NN NN.

Generally, phrases spoken or written by people can have many syntactic variations. For example, "make a payment arrangement" could also be phrased "urgently need to make payment arrangements." In one embodiment, the auditor creates a generalized set of patterns rather than a sequence of parts of speech (or "PoS") tags. In addition, generalized patterns also allow capture of similar structures having different semantics, which could also be important. For example, a fragment containing a verb followed by an object (a "Verb-Object fragment") is a Verb Phrase (VP) followed by a Noun Phrase (NP). This Verb-Object can be expressed as a regular expression:

Verb_Object=VP & NP where "&" signifies concatenation and where:
VP=optRB & "(\w+/VB.?)+" & optRB
optRB="(\w+/RB.?)*"
NP="(\w+/(DT|PRP\$?)") & Adj & "(\w+/(NN ?))+"
Adj="(\w+/(JJ.??|VBN|VBG)?)*"

The above regular expression will also capture a potential adjective (Adj) before the noun and an adverb (RB) after the verb, as well as new fragments such as "quickly start the services."

In addition, when the source of the text is speech, in some embodiments the automatic speech recognition system (ASR) and the extraction rules can be tuned for use with speech recognition results. For example, if articles (e.g., "a," "an," and "the") are often deleted or not present in speech recognition results, they can be made optional in the extraction rules. In addition, if only speech recognition results above a particular level of confidence are included in the text, this confidence may be tuned to optimize the process of fragment extraction.

In one embodiment of the present invention, all of the manually extracted fragments, along with their PoS tags, are supplied as input to a sequential pattern mining algorithm as described, for example, in U.S. patent application Ser. No. 13/952,459 "SYSTEM AND METHOD FOR DISCOVERING AND EXPLORING CONCEPTS," filed on Jul. 26, 2013, the entire disclosure of which is incorporated herein by reference and U.S. patent application Ser. No. 13/952,470 "SYSTEM AND METHOD FOR DISCOVERING AND EXPLORING CONCEPTS AND ROOT CAUSES OF EVENTS," filed on Jul. 26, 2013, the entire disclosure of which is incorporated herein by reference. By applying this algorithm to the manually extracted fragments and their PoS tags, the PoS sequences of interest (e.g., the extraction rules) can be automatically extracted.

Figure 8C:
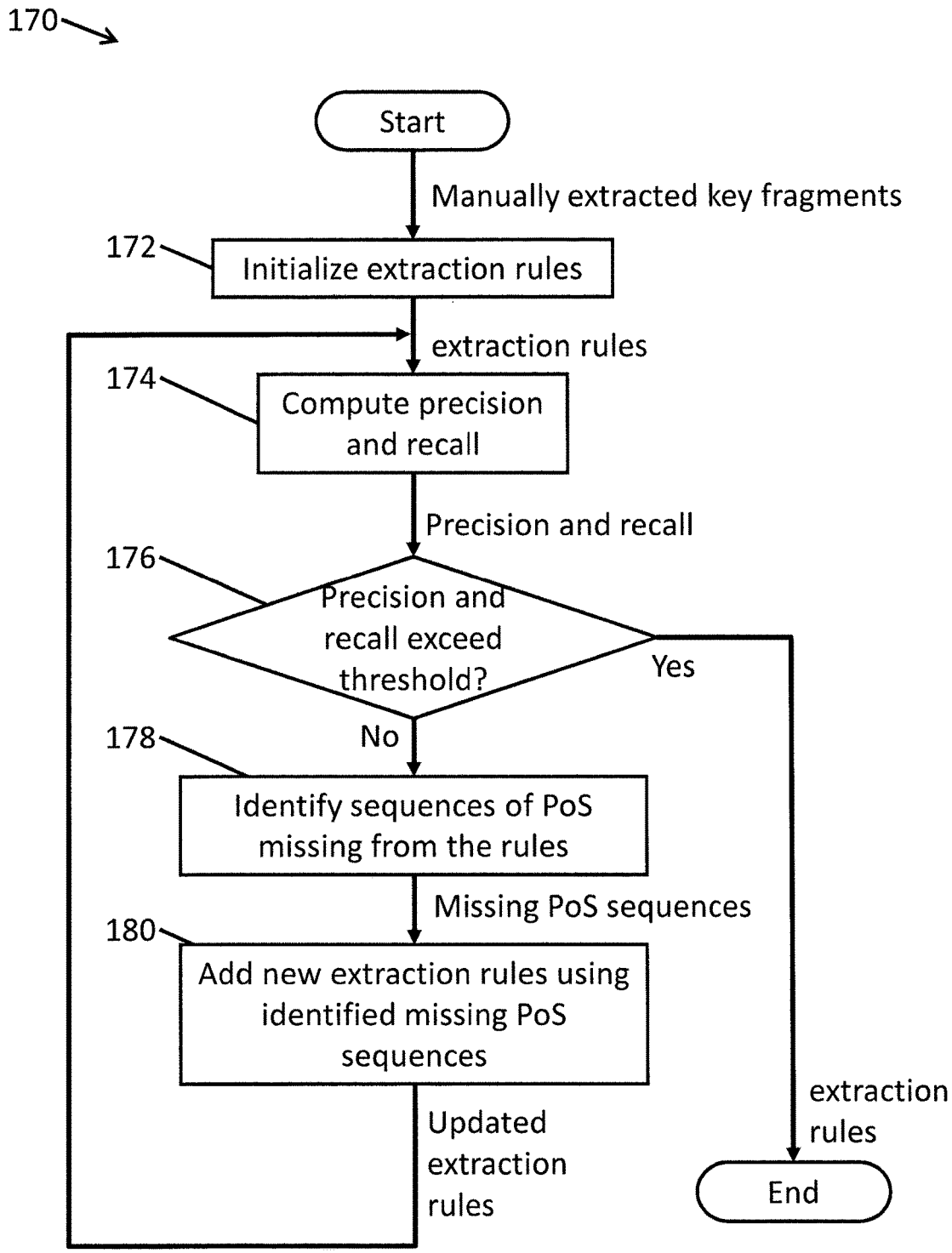
FIG. 8C is a flowchart illustrating a method for automatically generating extraction rules according to one embodiment of the present invention.

In another embodiment of the present invention, the manually extracted key fragments can be used as a "gold standard." For example, several thousand manually extracted key fragments can be used to create a set of extraction rules so as to optimize the precision and recall from this standard. FIG. 8C is a flowchart illustrating a method 170 for automatically generating a set of extraction rules given a standard. After initially setting a set of extraction rules, the quality of the rules evaluated by running the rules on the standard to generate a "precision" (or accuracy):

$$\text{precision} = \frac{tp}{tp + fp}$$

and a "recall" (or detection rate):

$$\text{recall} = \frac{tp}{tp + fn}$$

where "tp" stands for "true positive," "fp" stands for "false positive," and "fn" stands for "false negative."

The precision and recall can be combined to generate an "f-measure," where $$f = w_1 \times \text{precision} + w_2 \times \text{recall}$$

where weights $w_1$ and $w_2$ can be adjusted to alter the relative influences of precision and recall on the f-measure based on the usage scenario.

Referring to FIG. 8C, in operation 172, an initial set of extraction rules is generated (e.g., supplied from an external source such as an expert manually identifying one or more extraction rules of interest). Operation 174 computes the precision and recall of the rules as applied to the manually extracted key fragments. The computed precision and recall are then compared, in operation 176, against a threshold value to evaluate whether or not the rules are good enough. If not, then in operation 178 sequences of parts of speech that are missing from the rules but present in the manually extracted key fragments are identified. In operation 180, the identified missing part of speech sequences are added to the set of extraction rules and the process repeats from operation 174 with the updated set of extraction rules. The method 170 updates the extraction rules based on missing parts of speech sequences until the precision and recall values meet the threshold, at which point the computed extraction rules are output and the process ends.

In some embodiments of the present invention, rather than using manually extracted key fragments from among the documents, the supplied input is a set of sentences that are known to be of interest. The method 170 can also be applied to this set of sentences, with the exception that only recall (and not precision) can be used to evaluate the quality of the extraction rules.

Referring again to FIGS. 8A and 8B, in operation 108, the fragment extraction module 148 extracts fragments from the tagged text using the extraction rules. Continuing the above example, given the identified extraction rule of VB DT NN NN and given some set of tagged text that includes: "run/VB a/DT credit/NN check/NN" and "moving/VB any/DT gas/NN appliances/NNS", both of these fragments would be extracted from the tagged text because both match the VB DT NN NN extraction rule.

The fragments that were extracted in operation 100 are filtered in operation 200. The fragment extraction process in operation 100 will often include fragments that match an extraction rule (e.g., satisfy a particular order of parts of speech), but are not informative. Many of these "false accepts" can be filtered out in operation 200 based on the low frequency with which these fragments appear (e.g., only fragments that appear frequently are not filtered out).

In addition, some fragments can be filtered out based on having a low inverse document frequency (IDF), where the inverse document frequency (IDF) of a word is used to measure the saliency of word w, and the saliency of the fragment is given by the square of the sum of the IDFs of each of the words in the fragment:

$$IDF(w) = \log\left(\frac{N}{DF(w)}\right)$$

$$\text{Saliency(fragment)} = \sum_{w \in \text{fragment}} IDF(W)$$

where N is the total number of documents in the collection and DF(w) is the number of documents in which the word w appears.

However, some fragments have high IDF but may still be uninformative. For example, in some contexts a fragment like "have your phone number please" might be a fragment that matches one of the PoS extraction rules, but bears no information because almost every interaction with a particular contact center might ask the caller for his or her phone number for callback purposes.

In one embodiment of the present invention, a stop list of fragments can be used to further filter the extracted fragments, in which fragments that appear in the stop list are removed from the set of fragments to be considered. For example, in one embodiment the stop list includes a list of words and a fragment is filtered out (or removed) if all of the words in the fragment are on the stop list (e.g., if the fragment is made up only of words that are in the stop list).

In one embodiment of the present invention, the stop list can also include one or more regular expressions where, if a fragment matches any one of the regular expressions, the fragment is removed. For example, the regular expression "*expedite*call*" would match fragments "to expedite your call" and "to expedite this call", both of which are uninformative fragments in the context of a contact center.

In one embodiment of the present invention, the filtering process 200 only filters based on particular PoS tags. For example, the filtering process may only determine whether all of the words in a fragment tagged as nouns are in the stop list. In this example, if all of the nouns in the fragment are in the stop list, then the fragment is filtered out. In another example, only the verb phrases are analyzed by the filtering process.

According to one embodiment, fragments that are semantically related are grouped together (or clustered) as conveying the same idea in operation 300. FIG. 9A is a flowchart illustrating a method for generating base clusters of filtered fragments according to one embodiment of the present invention.

Clustering is a machine learning technique that can be used to take fragments as input and to cluster the fragments together when the important portions of the fragments are appear to be the similar or the same. Each one of these clusters is a concept (or topic or cluster) as mentioned above.

Figure 9B:
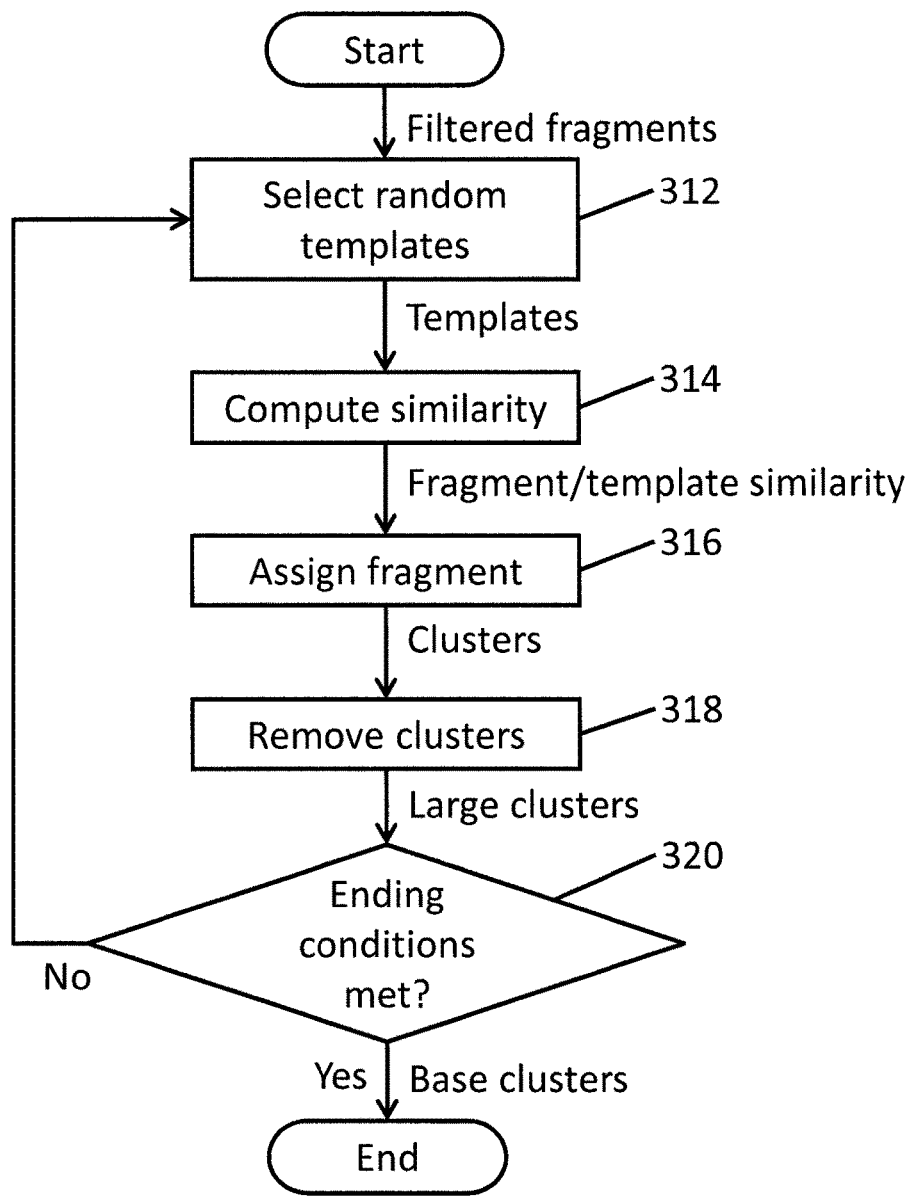
FIG. 9B is a flowchart illustrating a method for automatically generating base clusters of fragments according to one embodiment of the present invention.

FIG. 9B is a flowchart illustrating a method for clustering fragments according to one embodiment of the present invention. In operation 312, the clustering module 45b of the analytics server 45 selects a subset of the filtered fragments to serve as centers (or "templates") for the clusters. In operation 314, the similarity between each of the remaining fragments (fragments that were not selected to be templates) and each of the templates is computed. In operation 316, the fragments are assigned to clusters based on the computed similarities (e.g., each fragment is assigned to a cluster corresponding to the template that is most similar to the fragment). In operation 318, the clustering module 45b removes clusters that have few or no fragments attached to them. These templates (and their associated clusters) are removed and added to the pool of unassigned fragments. In operation 320, the clustering module 45b determines if some set of ending conditions have been met (e.g., if all the fragments have been tried as templates or if a certain number of iterations of the algorithm have been executed). If not, then the process repeats with the selection of new sentences to serve as additional templates in operation 312. After ending conditions have been met, the clustered fragments are output as base clusters.

To make the clustering faster, in one embodiment, only the most salient fragments are used. As such, in some embodiments of the present invention, the fragments are pruned by sorting the fragments by saliency and discarding the fragments with low saliency relative to the top ones. For example, in one embodiment, fragments with less than 5% of the saliency of the top ones are removed from consideration. The fragments are clustered to group together similar fragments that differ from one another only by less-salient words. The similarity of fragments can be measured based on various text mining measures, and is described in more detail below.

The saliency of each cluster may be computed based on text mining measures. According to one embodiment, the saliency of a cluster is constructed from a weighted sum of the saliencies of the fragments of the cluster:

$$S(\text{Cluster}) = \sum \frac{\text{fragment weight}}{\text{cluster size}} \text{Saliency}(\text{fragment})$$

In a manner similar to that described for sentence pruning, in one embodiment, only the top clusters will be presented to the user and clusters with lower saliencies may be pruned away.

Referring back to FIG. 9A, in operation 330, the clustering module 45b labels the base clusters obtained in operation 310. According to one embodiment, the base clusters are automatically labeled with words or phrases that describe the given base clusters. For example, given a base cluster that contains the fragments "have a medical baseline," "is called medical baseline," and "we also offer a medical baseline," one would expect this cluster automatically to be labeled "medical baseline."

Figure 9C:
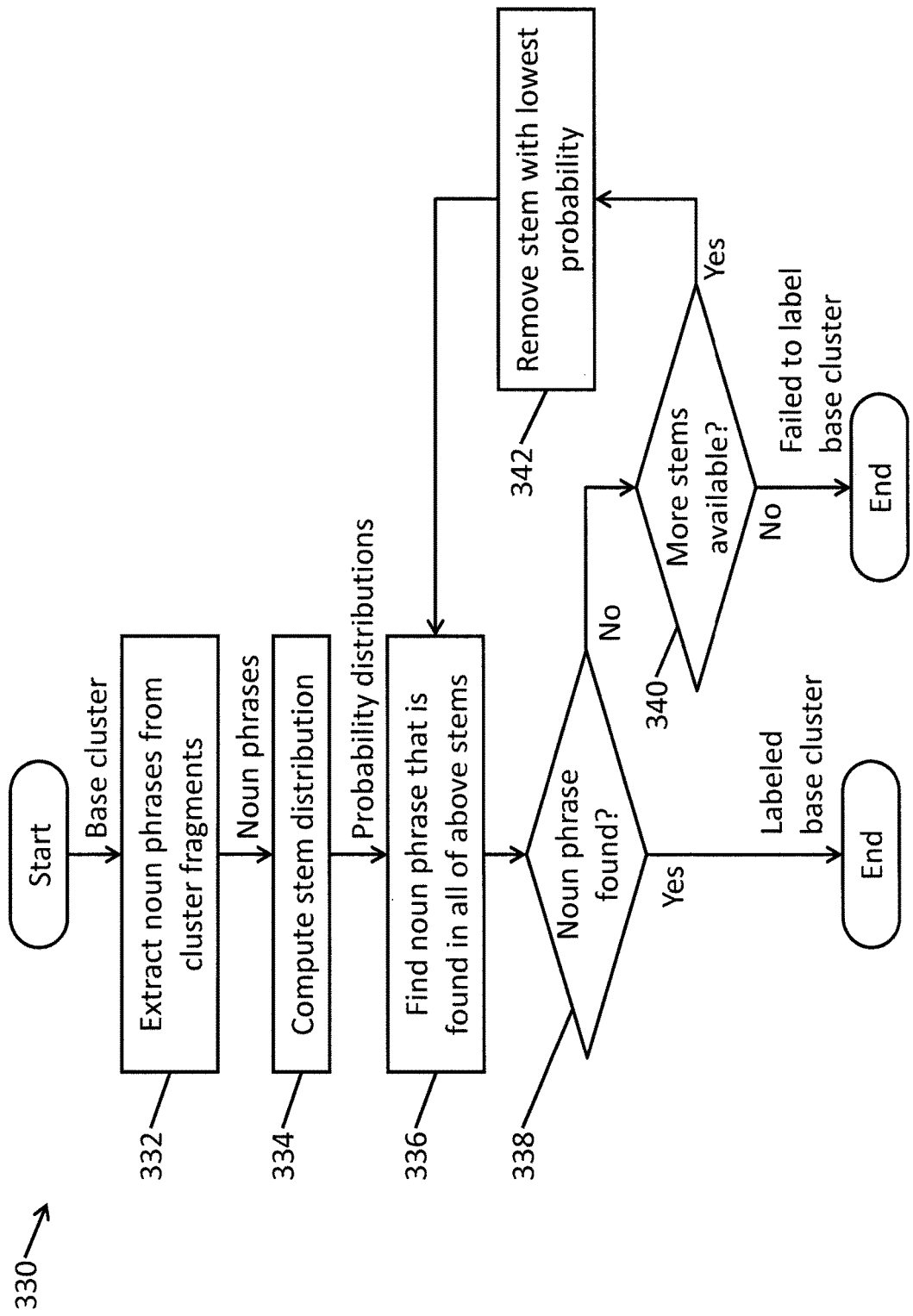
FIG. 9C is a flowchart illustrating a method for automatically generating labels for base clusters of fragments according to one embodiment of the present invention.

FIG. 9C is a flowchart illustrating a method for naming clusters according to one embodiment of the present invention. In operation 332, given a base cluster to be named, the clustering module 45b of the analytics server 45 extracts noun phrases from the base cluster's fragments. Stems from the noun phrases are then extracted in operation 334, the stems of stop words are, optionally, removed from the extracted noun phrases, and the distribution of the remaining noun phrases in the fragments is computed. The result is a set of probability distributions P(stem cluster) (or rate of appearance of stems of noun phrases in a given cluster, which may be referred to as a "stem distribution") for all of the stems in the noun phrases of the clusters. Noun phrases having a probability below a threshold value are removed.

Given the list of stems and the probability distributions calculated in operation 334, in operation 336 the clustering module 45b attempts to identify a noun phrase that contains all of the stems from the list of stems (or a noun phrase having the highest probability of appearing in the cluster according to the stem distribution). If such a phrase exists, then in operation 338 this noun phrase is output as the label for the given base cluster. If more than one such noun phrase exists, then take the noun phrase having higher frequency as the label.

If no such phrase is found, then in operation 340, the clustering module 45b determines if more stems are available from the list. If so, then the stem having lowest probability distribution is removed from the list in operation 342 and the process repeats with operation 336 to attempt to identify a stem that contains all of the remaining noun phrases. If no more stems are available, then the method fails to label the given base cluster.

Through the labeling process described above with respect to operation 340, two or more different base clusters may be labeled with the same label. In such a case, according to one embodiment, in operation 350, the clustering module 45b merges base clusters having the same name. The new base cluster will contain all of the fragments from all of the fragments having the same label, and this new base cluster will have the same label as the merged base clusters.

In operation 370, according to one embodiment of the present invention, some of the base clusters will be removed or omitted from the final result. Base clusters can be omitted according to several rules including: omitting base clusters that the labeling operation 330 was not able to label; omitting base clusters where all of the words of the label are in a filtering list; and omitting a base cluster when the entropy of the stems of the base cluster's noun phrases is greater than a threshold and is greater than the entropy of the stems of the base cluster's verb phrases.

Figure 10A:
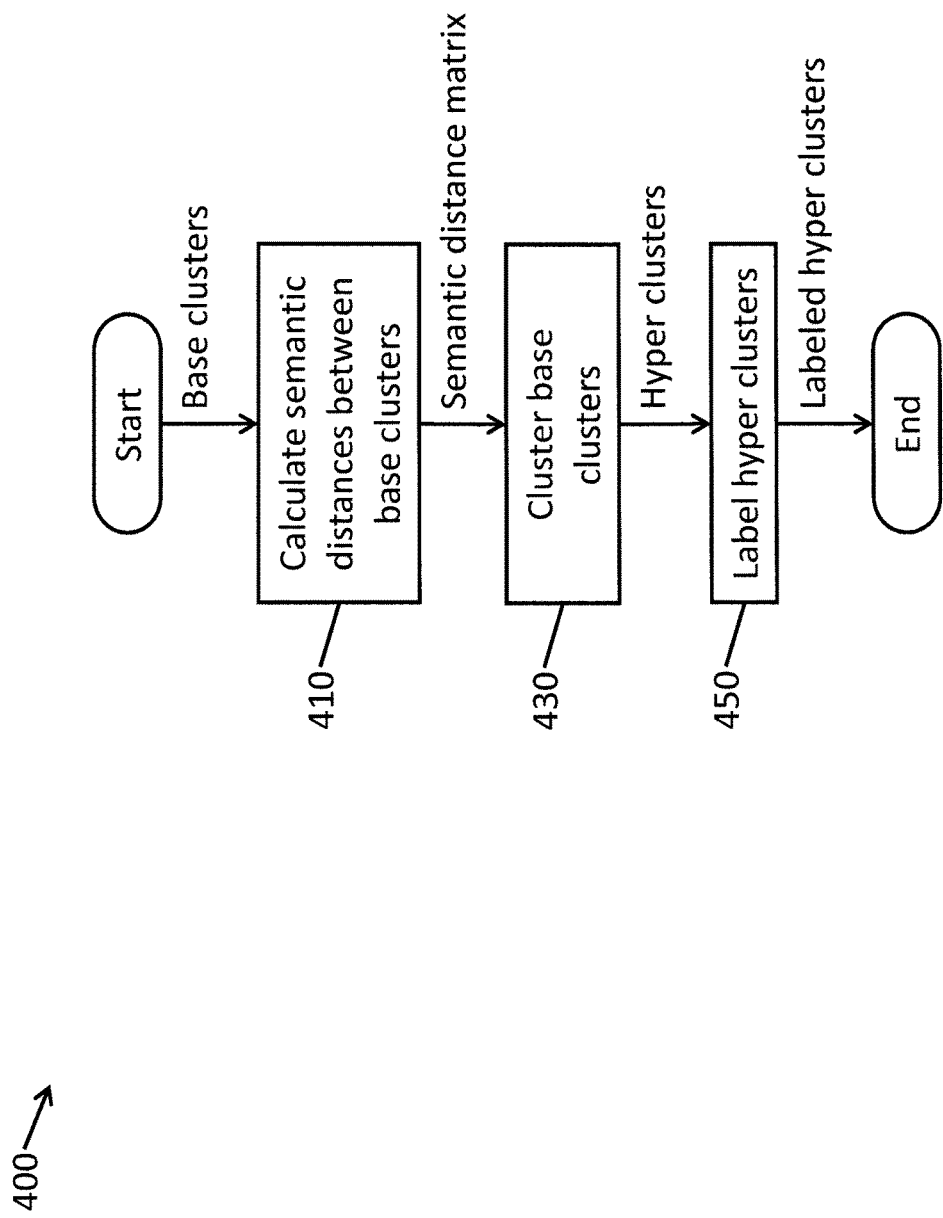
FIG. 10A is a flowchart illustrating a method for hyper clustering base clusters according to one embodiment of the present invention.
Figure 10B:
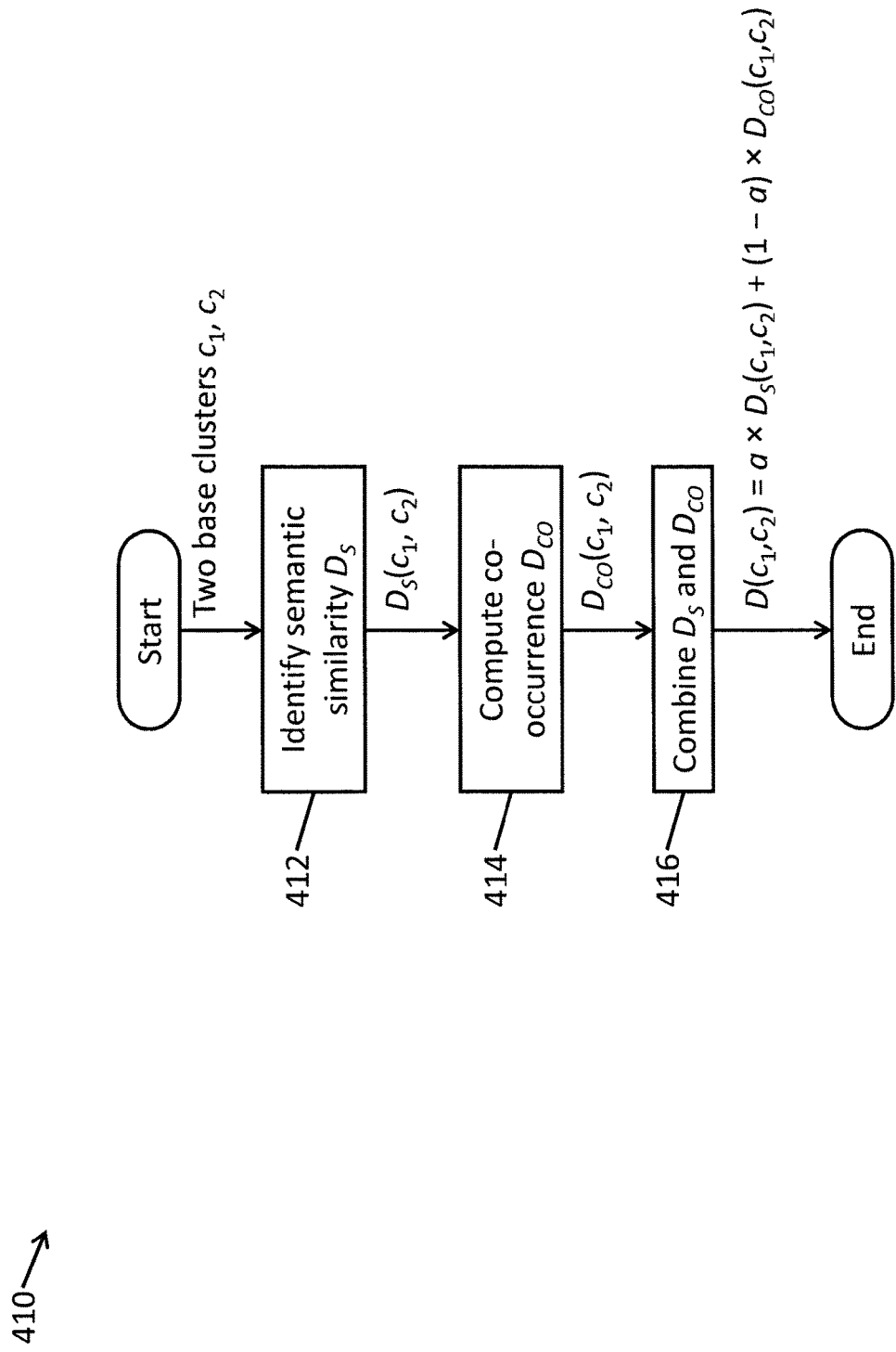
FIG. 10B is a flowchart illustrating a method for calculating a semantic distance between two base clusters according to one embodiment of the present invention.
Figure 10C:
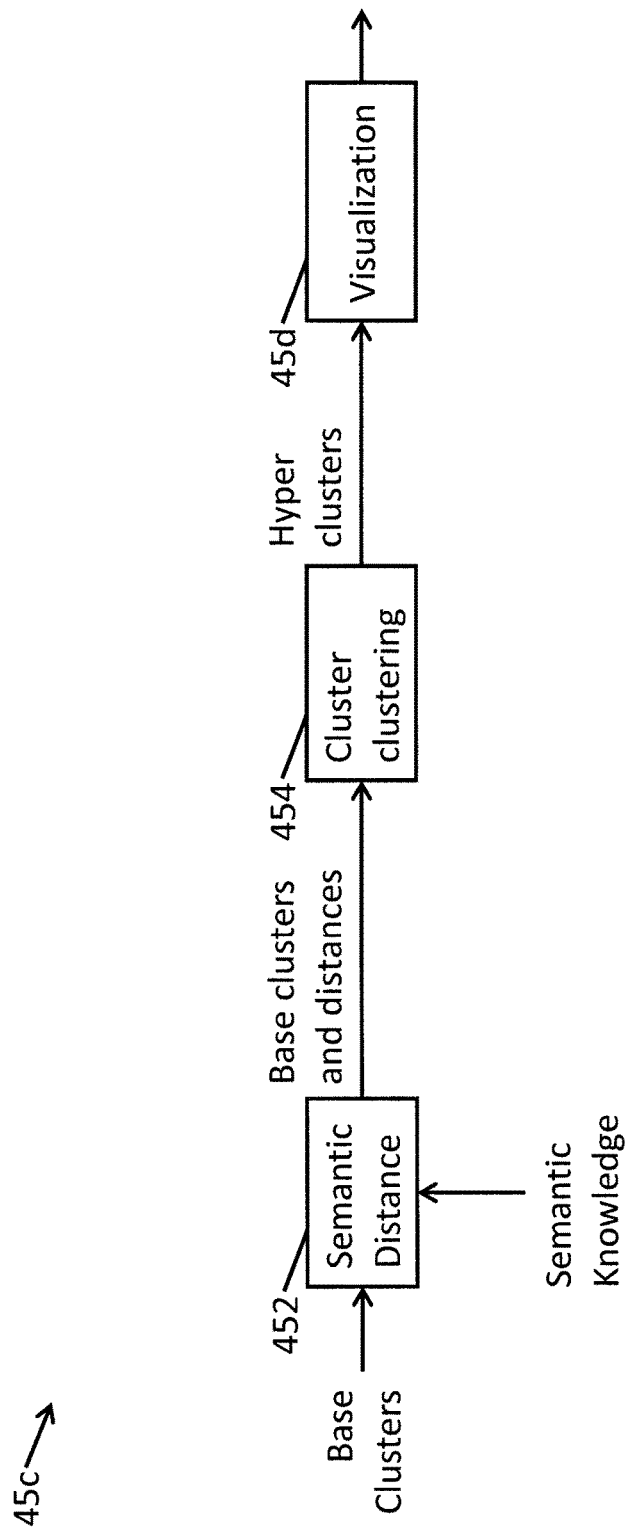
FIG. 10C is a block diagram illustrating a system for hyper clustering base clusters according to one embodiment of the present invention.

FIG. 10A is a flowchart illustrating a method for hyper clustering base clusters according to one embodiment of the present invention. FIG. 10B is a flowchart illustrating a method for calculating a semantic distance between two base clusters according to one embodiment of the present invention. FIG. 10C is a block diagram illustrating a system for hyper clustering base clusters according to one embodiment of the present invention.

Referring to FIGS. 10A and 10C, after clustering the fragments in operation 340, the semantic distance module 452 of the hyper clustering module 45c of the analytics server 45 clusters the base clusters into hyper clusters in operation 400 to generate a semantic hierarchy. Generally, when performed on a typical collection of documents related to interactions in a contact center, operation 300 will generate a set of several thousand base clusters, each with a corresponding size and saliency measure (described in more detail below).

When considering a large set of clusters, one might consider organizing (or further clustering) these clusters into a second hierarchy (or hyper cluster) of semantics. For example, Table 2 below illustrates a set of base clusters and their associated hyper clusters:

TABLE 2

| Hyper Cluster | Base Cluster Label |
|---|---|
| Medical Discount Application | medical baseline |
| | medical condition |
| | medical equipment |
| | doctor bill |
| Payment Arrangement | payment arrangement |
| | payment plan |
| | remaining balance |
| | rest of balance |

According to one embodiment, the second level hierarchy (or hyper clusters) uses another source of semantic information to group clusters, rather than relying on the frequency of identical words between different documents (or interactions). In particular, according to embodiments of the present invention the additional semantic information can come from existing systems for comparing the semantic similarity of words such as word2vec (see, e.g., Mikolov et al. "Distributed Representations of Words and Phrases and their Compositionality" NIPS 2013 3111-3119), DISCO (see, e.g. Kolb, P. "DISCO: A Multilingual Database of Distributionally Similar Words," KONVENS 2008, Supplementary Volume 37-44), and WordNet® (see, e.g., Fellbaum, C. "WordNet and wordnets." Brown, Keith et al. (eds.), Encyclopedia of Language and Linguistics, Second Edition, Oxford: Elsevier, 665-670). In addition, semantic information about the similarity of base clusters can be obtained based on the co-occurrence of the base clusters. These measures will be discussed in more detail below.

Given a measure of semantic similarity ($D_S$) and a measure of co-occurrence ($D_{CO}$) between two base clusters $c_1$ and $c_2$, according to one embodiment of the present invention, the semantic similarity (or "distance") between the two base clusters ($D(c_1,c_2)$) is defined as:

$$D(c_1,c_2) = a \times D_S(c_1,c_2) + (1-a) \times D_{CO}(c_1,c_2)$$

The measure of co-occurrence can be computed using, for example, point-wise mutual information (PMI) as described in, for example Bouma, G. "Normalized (Pointwise) Mutual Information in Collocation Extraction." Proc. of GSCL 2009.

According to one embodiment, the value of the constant a in the above equation is computed by calibrating the value against a manually generated "gold standard." According to another embodiment, a is tuned by trial and error during the clustering process.

According to one embodiment, the hyper clustering module 45c computes the semantic similarity $D_S$ in operation 410 using a source for semantic similarity information such as WordNet®, DISCO, and word2vec. For example, DISCO and WordNet® provide databases of similarities and returns a second order similarity (or semantic similarity) when supplied with two words or may return merely a binary "similar" or "not similar" result. As another example, word2vec merely provides a software package that is trained by the user. In the case of word2vec, the input text (e.g., the text output of the speech recognition system and the full text of the chat transcripts, social media interactions, emails, etc. associated with the contact center) or various portions thereof may be supplied to train the word2vec models.

As such, according to one embodiment of the present invention, and referring to FIG. 10B, the semantic similarity $D_S$ between two clusters $c_1$ and $c_2$ can be calculated by computing or looking up the semantic similarity of the corresponding labels of the clusters $c_1$ and $c_2$ using WordNet, DISCO, or word2vec in operation 412. The base cluster labels are an appropriate point of comparison for the semantic distance between the clusters because the base clusters are chosen based on their ability to represent the fragments contained within their respective base clusters.

The co-occurrence measure $D_{CO}$ can be calculated in operation 414 in a variety of ways according to various embodiment of the present invention. After the clustering process, every base cluster includes a set of fragments, where these fragments were extracted various documents (or interactions, e.g., transcripts of chat and social media interactions, emails, automatic speech-recognized voice calls, etc.). As such, for every base cluster, the fraction of interactions in which this cluster occurs can be calculated as:

$$P(c_0) = \frac{N(c_0)}{N}$$

where N is the total number of interactions and $N(c_0)$ is the number of interactions in which a fragment from cluster $c_0$ appears. As such, $P(c_0)$ represents the probability of finding a fragment from cluster $c_0$ in any interaction with the contact center.

In addition, the probability that two clusters appear together can be calculated as follows:

$$P(c_0, c_1) = \frac{N(c_0, c_1)}{N}$$

From these to probabilities, $P(c_0)$ and $P(c_0,c_1)$, the first order similarity between clusters can be computed based on the pointwise mutual information (pmi) or the normalized pointwise mutual information (npmi) between them:

$$pmi(c_0, c_1) = \log \frac{P(c_0, c_1)}{P(c_0)P(c_1)}$$

$$npmi(c_0, c_1) = \frac{pmi(c_0, c_1)}{-\log(P(c_0, c_1))}$$

In one embodiment $D_{CO}(c_0,c_1) = pmi(c_0,c_1)$.
In another embodiment, $D_{CO}(c_0,c_1) = npmi(c_0,c_1)$.
For two clusters that always occur together, $P(c_0,c_1) = P(c_0) = P(c_1)$ and $npmi(c_0,c_1) = 1$ the maximal value of nmpi. For two clusters that never appear together, $P(c_0,c_1) = 0$ and $npmi(c_0,c_1) = -1$, the minimal value of nmpi.

As such, in operation 416, the computed values $D_S$ and $D_{CO}$ are combined (e.g., in one embodiment $D(c_1,c_2) = a \times D_S(c_1,c_2) + (1-a) \times D_{CO}(c_1,c_2)$) and output.

Given a distance matrix $D(c_1,c_2)$ between every pair of base clusters $c_1$ and $c_2$, according to one embodiment of the present invention, the cluster clustering module 454 of the hyper clustering module 45c applies a clustering algorithm in operation 430 to determine whether or not two base clusters belong to the same hyper cluster. This clustering algorithm can be a modified version of the algorithm described above for clustering fragments into base clusters, but with the substitution of, for example, the selection of a random base cluster in operation 312, the use of distances $D(c_1,c_2)$ for the computation of similarity in operation 314, and the assignment of base clusters to hyper clusters in operation 316. Other clustering techniques could also be used, such as the Chinese whispers algorithm described in, for example, Biemann, C. "Chinese whispers: an efficient graph clustering algorithm and its application to natural language processing problems." Proc. of the First Workshop on Graph Based Methods for Natural Language Processing (2006) 73-80.

In operation 450, each of the hyper clusters can then be labeled in a manner similar to that described above with respect to labeling a single base cluster in operation 330 (see, e.g., FIG. 9C), but by selecting the best noun phrase from all the noun phrases of all of the base clusters of the hyper clusters rather than the noun phrases of a single base cluster (as would be the case when labeling a single base cluster).

The resulting set of hyper clusters of base clusters can then be transformed by the GUI module 45d of the analytics server 45 and output for display on a user terminal such as an agent device 38 or other general purpose computing device. FIG. 6A illustrates the display of multiple hyper clusters (and possible a number of base clusters) according to one embodiment of the present invention and FIGS. 6B and 6C respectively show a "zoomed in" view of a single hyper cluster (e.g., the hyper clusters "payment" and "access issues" respectively), where FIGS. 6B and 6C illustrate base clusters grouped within their parent hyper clusters. According to one embodiment, further zooming in on any of the base clusters would show the underlying fragments contained within those base clusters.

The various hyper clusters and base clusters shown in FIGS. 6A, 6B, and 6C are represented as circles of various sizes and spaced apart at various distances, where the relative sizes signify the relative frequency with which fragments contained within those clusters or hyper clusters appeared in the data set of interest, and wherein the distance between the circles represent their semantic distances from one another, so that frequently discussed topics appear larger in the display and related concepts appear close to one another.

According to some embodiments of the present invention, the progress of clusters can be tracked over time to help detect changes in the data. For example, embodiments of the present invention are directed to methods of detecting events that are emerging (e.g., events that did not occur until a particular period in time and then suddenly start occurring) and detecting events that stop happening.

According to one embodiment of the present invention, changes in clusters ("movers and shakers") between two different periods of time (e.g., Period A and Period B) can be detected using substantially the same process of base clustering as described above with respect to operation 300, but performed on all the interactions contained in Period A along with all the interactions contained in Period B while keeping track of which period (Period A or Period B) the fragments contained within the clusters came from. After clustering for both these two periods combined, the number of fragments originating from each period (or both periods) is extracted, thereby allowing the detection of new topics and the disappearance of other topics. For example, if Period B is later in time than Period A, and all of the fragments containing the words "credit card overcharge" appear in Period B, then the system would detect that a new topic related to "credit card overcharges" appeared in Period B.

One aspect of embodiments of the present invention is directed to tracking particular topics or categories over time. As discussed above, the labeling of base clusters in operation 330 is performed automatically based on the fragments contained in the clusters and possibly based on the randomly chosen template fragments. Therefore, the processes described above may generate base clusters and hyper clusters whose names may change over time, though they represent substantially the same topics.

According to one embodiment, to track topics over time while accounting for this potential drift in cluster labels, an initial set of data for clustered periods is generated. For example, in one embodiment, tracking begins after having completed the clustering process for ten days. Each of these periods (e.g., each of these ten days) includes a set of hyper clusters, where each hyper cluster contains a set of base clusters. Both the hyper clusters and the base clusters, however, can be represented by a distribution over words. For example, the "payment arrangement" hyper cluster may contain base clusters "payment arrangement" and "payment plan." Due to the presence of other fragments that may also exist in these base clusters, the word distribution in these clusters may look like Table 3 below:

TABLE 3

| Word | Probability |
|---|---|
| Payment | 0.4 |
| Plan | 0.1 |
| Arrangement | 0.1 |
| Get | 0.1 |
| Have | 0.1 |
| Cancel | 0.1 |
| Arrangement | 0.1 |

According to one embodiment of the present invention, a word distribution can be represented by a separate noun and verb distribution, and more weight is given to the noun than to the verb.

Once word distributions are computed, in order to track hyper clusters over time, embodiments of the present invention can compare whether two clusters are the same by determining whether their divergence (for example Kullback-Leibler divergence) meets a particular threshold requirement.

Embodiments of the invention can be practiced as methods or systems. Computer devices or systems including, for example, a microprocessor, memory, a network communications device, and a mass storage device can be used to execute the processes described above in an automated or semi-automated fashion. In other words, the above processes can be coded as computer executable code and processed by the computer device or system.

It should also be appreciated from the above that various structures and functions described herein may be incorporated into a variety of apparatus. In some embodiments, hardware components such as processors, controllers, and/or logic may be used to implement the described components or circuits. In some embodiments, code such as software or firmware executing on one or more processing devices may be used to implement one or more of the described operations or components.

As would be understood by one of ordinary skill in the art, the processes described herein and as illustrated in the flowcharts in the figures may be implemented by instructions stored in computer memory to control a computer processor to perform the described functions. In addition, steps and operations shown in the flowchart do not need to be executed in the order shown and person of ordinary skill in the art at the time the invention was made the order of the steps and operations performed may vary without deviating from or substantially altering the underlying technique.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An analytics system configured to automatically detect and categorize topics in a plurality of interactions between customers and agents of a contact center during one or more time periods, the interactions comprising a plurality of phrases, the analytics system comprising:
a processor; and
a memory, wherein the memory has instructions stored thereon that, when executed by the processor, cause the processor to:
extract a plurality of fragments of the phrases from the interactions in accordance with one or more extraction rules, the extraction rules being automatically generated based on sequences of parts of speech found in a set of key fragments of the fragments by:
tagging words or phrases of the key fragments with corresponding parts-of-speech tags to generate sequences of parts-of-speech tags;
identifying one or more of sequences of parts-of-speech tags appearing at least a threshold number of times among the key fragments; and
outputting the identified one or more of sequences of parts-of-speech tags as the one or more extraction rules;
filter the fragments to generate a filtered plurality of fragments by removing fragments based on at least one of:

a frequency with which the removed fragments appear among the fragments;

a saliency of the removed fragments; and a stop list;

cluster the filtered plurality of fragments into a plurality of first clusters, each of the first clusters comprising a plurality of semantically similar fragments corresponding to a detected topic of the topics in the interactions;

cluster the first clusters into a plurality of second clusters, each of the second clusters corresponding to a categorization of the topics based on semantic similarity; and output a hierarchy of concepts in accordance with the filtered plurality of fragments clustered into the first clusters of topics and the second clusters of categorizations of topics.

2. The analytics system of claim 1, wherein the instructions that cause the processor to extract the fragments from the interactions comprise instructions that, when executed by the processor, cause the processor to:

receive text corresponding to the interactions;

tag portions of the text based on parts of speech; and extract fragments from the text in accordance with the one or more extraction rules.

3. The analytics system of claim 2, wherein the interactions comprise speech between the customers and the agents of the contact center, and wherein the text corresponding to the interactions comprises an output of an automatic speech recognition engine, the output being generated by processing speech of at least one of the customers and speech of at least one of the agents from at least one of the interactions through the automatic speech recognition engine.

4. The analytics system of claim 1, wherein the memory further has stored thereon instructions that, when executed by the processor, cause the processor to label a first cluster of the first clusters by:

extracting a plurality of noun phrases from the first cluster;

computing a distribution of probabilities of stems of the noun phrases; and identifying a label noun phrase of the noun phrases, the label noun phrase having a highest probability based on the distribution of probabilities of stems of the noun phrases.

5. The analytics system of claim 1, wherein the instructions that cause the processor to cluster the first clusters into the second clusters comprise instructions that, when executed by the processor, cause the processor to:

compute a plurality of semantic distances between pairs of the first clusters; and cluster the first clusters into the second clusters in accordance with the semantic distances.

6. The analytics system of claim 5, wherein the instructions that cause the processor to compute the semantic distances between the pairs of the first clusters comprise instructions to compute a semantic distance of the semantic distances based on semantic similarities between the pairs of the first clusters and co-occurrence of fragments in the pairs of the first clusters.

7. The analytics system of claim 1, wherein the memory further has stored thereon instructions that, when executed by the processor, cause the processor to output the hierarchy of concepts by:

generating a visualization of the hierarchy of concepts; and outputting the visualization of the hierarchy of concepts.

8. A method for performing analytics to automatically detect and categorize topics in a plurality of interactions between customers and agents of a contact center during one or more time periods, the interactions comprising a plurality of phrases, the method comprising:

extracting, by a processor of an analytics system, a plurality of fragments of the phrases from the interactions in accordance with one or more extraction rules, the extraction rules being automatically generated based on sequences of parts of speech found in a set of key fragments of the fragments by:

tagging words or phrases of the key fragments with corresponding parts-of-speech tags to generate sequences of parts-of-speech tags;

identifying one or more of sequences of parts-of-speech tags appearing at least a threshold number of times among the key fragments; and outputting the identified one or more of sequences of parts-of-speech tags as the one or more extraction rules;

filtering, by the processor, the fragments to generate a filtered plurality of fragments by removing fragments based on at least one of:

a frequency with which the removed fragments appear among the fragments;

a saliency of the removed fragments; and a stop list;

clustering, by the processor, the filtered plurality of fragments into a plurality of first clusters, each of the first clusters comprising a plurality of semantically similar fragments corresponding to a detected topic of the topics in the interactions;

clustering, by the processor, the first clusters into a plurality of second clusters, each of the second clusters corresponding to a categorization of the topics based on semantic similarity; and outputting, by the processor, a hierarchy of concepts in accordance with the filtered plurality of fragments clustered into the first clusters of topics and the second clusters of categorizations of topics.

9. The method of claim 8, further comprising:

receiving text corresponding to the interactions;

tagging portions of the text based on parts of speech; and extracting fragments from the text in accordance with the one or more extraction rules.

10. The method of claim 9, wherein the interactions comprise speech between the customers and the agents of the contact center, and wherein the text corresponding to the interactions comprises an output of an automatic speech recognition engine, the output being generated by processing speech of at least one of the customers and speech of at least one of the agents from at least one of the interactions through the automatic speech recognition engine.

11. The method of claim 8, further comprising:

extracting a plurality of noun phrases from the first clusters;

computing a distribution of probabilities of stems of the noun phrases; and identifying a label noun phrase of the noun phrases, the label noun phrase having a highest probability based on the distribution of probabilities of stems of the noun phrases.

12. The method of claim 8, further comprising:
computing a plurality of semantic distances between pairs of the first clusters; and
clustering the first clusters into the second clusters in accordance with the semantic distances.

13. The method of claim 12, wherein the computing a plurality of semantic distances between pairs of the first clusters comprises computing a semantic distance of the semantic distances based on semantic similarities between the pairs of the first clusters and co-occurrence of fragments in the pairs of the first clusters.

14. The method of claim 8, wherein the outputting the hierarchy of concepts comprises generating and outputting a visualization of the hierarchy of concepts.

15. The system of claim 1, wherein the memory further stores instructions that, when executed by the processor, cause the processor to further automatically generate the one or more extraction rules by:
validating the one or more extraction rules in accordance with a precision and a recall of each extraction rule against the key fragments.

16. The method of claim 8, further comprising validating the one or more extraction rules in accordance with a precision and a recall of each rule against the key fragments.

* * * * *